(12) United States Patent
Yerramalli et al.

(10) Patent No.: US 11,381,981 B2
(45) Date of Patent: Jul. 5, 2022

(54) LISTEN-BEFORE-TALK SCHEMES FOR DIRECTIONAL COMMUNICATIONS

(71) Applicant: QUALCOMM Incorporated, San Diego, CA (US)

(72) Inventors: Srinivas Yerramalli, San Diego, CA (US); Xiaoxia Zhang, San Diego, CA (US); Tao Luo, San Diego, CA (US); Arumugam Chendamarai Kannan, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/745,281

(22) Filed: Jan. 16, 2020

(65) Prior Publication Data

US 2020/0252806 A1     Aug. 6, 2020

Related U.S. Application Data

(60) Provisional application No. 62/799,727, filed on Jan. 31, 2019.

(51) Int. Cl.
*H04B 7/06* (2006.01)
*H04W 16/14* (2009.01)
(Continued)

(52) U.S. Cl.
CPC ......... *H04W 16/28* (2013.01); *H04W 72/046* (2013.01); *H04W 72/082* (2013.01); *H04W 74/0808* (2013.01)

(58) Field of Classification Search
None
See application file for complete search history.

(56) References Cited

U.S. PATENT DOCUMENTS

2018/0115996 A1    4/2018  Si et al.
2019/0215140 A1*   7/2019  Hafeez ............... H04B 7/0695
(Continued)

FOREIGN PATENT DOCUMENTS

CN    107835516 A  *  3/2018
CN    107835516 A     3/2018
WO    WO-2017020293 A1  2/2017

OTHER PUBLICATIONS

International Search Report and Written Opinion—PCT/US2020/014111—ISA/EPO—dated Apr. 20, 2020.

*Primary Examiner* — Ajit Patel
(74) *Attorney, Agent, or Firm* — Holland & Hart LLP

(57) ABSTRACT

Methods, systems, and devices for wireless communications are described. In some systems, wireless devices operating in an unlicensed radio frequency spectrum band may perform directional listen-before-talk (LBT) procedures to gain access to a channel. In a beam-shrinking scheme for directional LBT, a wireless device may start an LBT procedure using a first beam (e.g., a wide beam). If the clear channel assessment (CCA) fails for the first beam (e.g., due to directional interference), the device may switch the LBT procedure to a second beam (e.g., a narrower beam). Depending on the direction of the interference source, the second beam may result in a successful LBT procedure. In a beam sweeping scheme for directional LBT, a wireless device may perform concurrent LBT over multiple narrow beams. If any beam of the set of beams detects frequent or continuous interference, the device may drop that beam from the concurrent LBT procedure.

27 Claims, 13 Drawing Sheets

(51) Int. Cl.
    *H04W 16/28*     (2009.01)
    *H04W 72/08*     (2009.01)
    *H04W 72/04*     (2009.01)
    *H04W 74/08*     (2009.01)

(56) References Cited

U.S. PATENT DOCUMENTS

| | | | |
|---|---|---|---|
| 2019/0268939 A1* | 8/2019 | Yang | H04W 72/042 |
| 2019/0373635 A1* | 12/2019 | Yang | H04B 7/0408 |
| 2020/0037366 A1* | 1/2020 | Cui | H04W 16/28 |
| 2020/0314906 A1* | 10/2020 | Goyal | H04B 7/0695 |
| 2020/0383136 A1* | 12/2020 | Xie | H04B 7/06 |
| 2021/0037428 A1* | 2/2021 | Du | H04B 7/0617 |

* cited by examiner

LISTEN-BEFORE-TALK SCHEMES FOR DIRECTIONAL COMMUNICATIONS

CROSS REFERENCE

The present application for patent claims the benefit of U.S. Provisional Patent Application No. 62/799,727, by YERRAMALLI et al., entitled "LISTEN-BEFORE-TALK SCHEMES FOR DIRECTIONAL COMMUNICATIONS," filed Jan. 31, 2019, assigned to the assignee hereof, and expressly incorporated herein.

BACKGROUND

The following relates generally to wireless communications, and more specifically to listen-before-talk (LBT) schemes for directional communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may communicate over a channel in a shared or unlicensed radio frequency spectrum band. To gain access to the channel, a wireless device may perform contention-based channel access. Contention-based channel access may allow a number of wireless devices to share the channel resources (e.g., time resources, frequency resources, etc.) of the unlicensed radio frequency spectrum band. To limit interference and signal collision on the channel, the wireless devices may perform LBT procedures to detect when the channel is clear for transmission. In an LBT procedure, if a device determines that the channel is clear of transmissions for a certain amount of time, the device may transmit over the channel using shared channel resources. In some cases, wireless devices may communicate using directional (e.g., beamformed) transmissions.

SUMMARY

The described techniques relate to improved methods, systems, devices, and apparatuses that support listen-before-talk (LBT) schemes for directional communications. Generally, the described techniques provide for reducing latency involved in contention-based channel access procedures. For example, in some wireless communications systems, wireless devices operating in an unlicensed radio frequency spectrum band may perform LBT procedures to gain access to a channel. Wireless devices may also communicate using directional (e.g., beamformed) transmissions, and thus a level of interference observed by a device may depend on the direction and shape of a beam used by the device for communications as well as the direction and shape of any interfering signals. To improve the likelihood of a successful clear channel assessment (CCA), a wireless device may implement directional LBT. A directional LBT procedure may involve the wireless device monitoring the channel in a specific direction using a receive beam, which may reduce the effects of interference (directional or otherwise) over the channel. If a CCA passes for the channel using the receive beam, the wireless device may transmit on the channel using a transmit beam corresponding to the receive beam (e.g., with a similar direction, beam width, etc.).

The wireless device may implement one or more directional LBT schemes for reducing the latency involved in accessing the channel. In a beam-shrinking scheme for directional LBT, a wireless device may start an LBT procedure using a wide beam. If the CCA fails for the wide beam (e.g., due to directional interference), the device may switch the LBT procedure to a narrower beam. Depending on the direction of the interference source, the narrower beam may mitigate the interference and result in a successful LBT procedure. When switching beams, the device may either update or maintain one or more parameters (e.g., a counter value, a contention window (CW) value, an initial countdown value, etc.) associated with the LBT procedure based on a configuration of the device. In a beam sweeping scheme for directional LBT, a wireless device may perform concurrent LBT over multiple narrow beams. The device may implement a single counter for determining whether LBT is successful across the entire set of beams. If any beam of the set of beams detects frequent or continuous interference, the device may drop that beam from the set of beams for the concurrent LBT procedure.

A method for wireless communications is described. The method may include performing a first CCA for a channel using a first beam, detecting interference for the first beam on the channel based on the first CCA, and performing a second CCA for the channel using a second beam based on the detected interference for the first beam, where the second beam is different from the first beam.

An apparatus for wireless communications is described. The apparatus may include a processor, memory in electronic communication with the processor, and instructions stored in the memory. The instructions may be executable by the processor to cause the apparatus to perform a first CCA for a channel using a first beam, detect interference for the first beam on the channel based on the first CCA, and perform a second CCA for the channel using a second beam based on the detected interference for the first beam, where the second beam is different from the first beam.

Another apparatus for wireless communications is described. The apparatus may include means for performing a first CCA for a channel using a first beam, means for detecting interference for the first beam on the channel based on the first CCA, and means for performing a second CCA for the channel using a second beam based on the detected interference for the first beam, where the second beam is different from the first beam.

A non-transitory computer-readable medium storing code for wireless communications is described. The code may include instructions executable by a processor to perform a first CCA for a channel using a first beam, detect interference for the first beam on the channel based on the first CCA, and perform a second CCA for the channel using a second beam based on the detected interference for the first beam, where the second beam is different from the first beam.

In some examples of the method, apparatuses, and non-transitory computer-readable medium described herein, the first beam may have a first beam width and the second beam may have a second beam width that is narrower than the first beam width.

Some examples of the method, apparatuses, and non-transitory computer-readable medium described herein may further include operations, features, means, or instructions for detecting additional interference for the second beam on the channel based on the second CCA and performing a third CCA for the channel using a third beam with a third beam width based on the detected additional interference for the second beam, where the third beam width may be narrower than the second beam width.

In some examples of the method, apparatuses, and non-transitory computer-readable medium described herein, performing the first CCA may include operations, features, means, or instructions for selecting a countdown value for the first beam from a range of countdown values, where a maximum countdown value of the range of countdown values corresponds to a CW value for the first beam, starting a counter from the selected countdown value for the first beam, monitoring the channel using the first beam based on starting the counter, and decreasing the counter by one for each transmission time interval (TTI) that the channel may be determined to be clear according to the monitoring the channel using the first beam, where the interference for the first beam may be detected based on the monitoring the channel using the first beam.

In some examples of the method, apparatuses, and non-transitory computer-readable medium described herein, the counter may include a first counter value when the interference for the first beam is detected. In some examples of the method, apparatuses, and non-transitory computer-readable medium described herein, performing the second CCA may include operations, features, means, or instructions for continuing the counter from the first counter value, monitoring the channel using the second beam based on continuing the counter, and decreasing the counter by one for each TTI that the channel may be determined to be clear according to the monitoring of the channel using the second beam.

In some examples of the method, apparatuses, and non-transitory computer-readable medium described herein, performing the second CCA may include operations, features, means, or instructions for restarting the counter from the selected countdown value for the first beam or an updated countdown value for the second beam, monitoring the channel using the second beam based on restarting the counter, and decreasing the counter by one for each TTI that the channel may be determined to be clear according to the monitoring of the channel using the second beam.

In some examples of the method, apparatuses, and non-transitory computer-readable medium described herein, the counter may include a first counter value when the interference for the first beam is detected. In some examples of the method, apparatuses, and non-transitory computer-readable medium described herein, performing the second CCA may include operations, features, means, or instructions for modifying the first counter value based on a penalty value, continuing the counter from the modified first counter value, monitoring the channel using the second beam based on continuing the counter, and decreasing the counter by one for each TTI that the channel may be determined to be clear according to the monitoring of the channel using the second beam.

In some examples of the method, apparatuses, and non-transitory computer-readable medium described herein, a CW value for the second beam may be equal to the CW value for the first beam. In other examples of the method, apparatuses, and non-transitory computer-readable medium described herein, performing the second CCA may include operations, features, means, or instructions for determining an updated CW value for the second beam that may be different from the CW value for the first beam.

In some examples of the method, apparatuses, and non-transitory computer-readable medium described herein, a countdown value for the second beam may be equal to the selected countdown value for the first beam. In other examples of the method, apparatuses, and non-transitory computer-readable medium described herein, performing the second CCA may include operations, features, means, or instructions for selecting an updated countdown value for the second beam that may be different from the selected countdown value for the first beam.

In some examples of the method, apparatuses, and non-transitory computer-readable medium described herein, the countdown value for the first beam may be selected from the range of countdown values based on a random number generation process. In some examples of the method, apparatuses, and non-transitory computer-readable medium described herein, a CCA passes if the counter reaches zero.

In some examples of the method, apparatuses, and non-transitory computer-readable medium described herein, the first beam may correspond to a first beam direction and the second beam may correspond to a second beam direction different from the first beam direction.

Some examples of the method, apparatuses, and non-transitory computer-readable medium described herein may further include operations, features, means, or instructions for detecting additional interference for the second beam on the channel based on the second CCA and performing a third CCA for the channel using the first beam based on the detected additional interference for the second beam.

In some examples of the method, apparatuses, and non-transitory computer-readable medium described herein, the second CCA may pass for the channel using the second beam. Some examples of the method, apparatuses, and non-transitory computer-readable medium described herein may further include operations, features, means, or instructions for transmitting a signal over the channel using the second beam based on the second CCA passing.

Some examples of the method, apparatuses, and non-transitory computer-readable medium described herein may further include operations, features, means, or instructions for determining a channel occupancy time (COT) duration based on a beam width of the second beam, where the signal may be transmitted according to the COT duration.

Some examples of the method, apparatuses, and non-transitory computer-readable medium described herein may further include operations, features, means, or instructions for receiving a negative acknowledgment message in response to the signal and re-transmitting the signal over the channel using a third beam based on the negative acknowledgment message, where the third beam is different from the second beam (and, in some cases, the first beam).

A method for wireless communications is described. The method may include starting a counter for a set of CCAs for a channel, where each CCA of the set of CCAs is performed using a respective beam of a set of beams, monitoring the channel using the set of beams based on starting the counter, decreasing the counter by a decrement value for each TTI that the channel is determined to be clear (e.g., unoccupied) for each beam of the set of beams based on the monitoring, and transmitting one or more signals over the channel using one or more beams of the set of beams based on the counter reaching a threshold value.

An apparatus for wireless communications is described. The apparatus may include a processor, memory in electronic communication with the processor, and instructions stored in the memory. The instructions may be executable by the processor to cause the apparatus to start a counter for a set of CCAs for a channel, where each CCA of the set of CCAs is performed using a respective beam of a set of beams, monitor the channel using the set of beams based on starting the counter, decrease the counter by a decrement value for each TTI that the channel is determined to be clear for each beam of the set of beams based on the monitoring, and transmit one or more signals over the channel using one or more beams of the set of beams based on the counter reaching a threshold value.

Another apparatus for wireless communications is described. The apparatus may include means for starting a counter for a set of CCAs for a channel, where each CCA of the set of CCAs is performed using a respective beam of a set of beams, monitoring the channel using the set of beams based on starting the counter, decreasing the counter by a decrement value for each TTI that the channel is determined to be clear for each beam of the set of beams based on the monitoring, and transmitting one or more signals over the channel using one or more beams of the set of beams based on the counter reaching a threshold value.

A non-transitory computer-readable medium storing code for wireless communications is described. The code may include instructions executable by a processor to start a counter for a set of CCAs for a channel, where each CCA of the set of CCAs is performed using a respective beam of a set of beams, monitor the channel using the set of beams based on starting the counter, decrease the counter by a decrement value for each TTI that the channel is determined to be clear for each beam of the set of beams based on the monitoring, and transmit one or more signals over the channel using one or more beams of the set of beams based on the counter reaching a threshold value.

Some examples of the method, apparatuses, and non-transitory computer-readable medium described herein may further include operations, features, means, or instructions for monitoring the channel using a first beam of the set of beams, identifying, for the first beam, that the channel is clear for a TTI based on the monitoring the channel using the first beam, and monitoring the channel using a second beam of the set of beams based on the identifying that the channel may be clear for the TTI. In some examples of the method, apparatuses, and non-transitory computer-readable medium described herein, the counter may be started based on identifying, for each beam of the set of beams, that the channel is clear for a TTI.

Some examples of the method, apparatuses, and non-transitory computer-readable medium described herein may further include operations, features, means, or instructions for detecting interference on the channel for a beam of the set of beams for a threshold number of contiguous TTIs and removing the beam from the set of beams based on the detected interference. Some examples of the method, apparatuses, and non-transitory computer-readable medium described herein may further include operations, features, means, or instructions for restarting the counter based on removing the beam from the set of beams.

Some examples of the method, apparatuses, and non-transitory computer-readable medium described herein may further include operations, features, means, or instructions for detecting interference on the channel for a beam of the set of beams for a threshold number of contiguous TTIs and stopping the set of CCAs for the channel based on the detected interference.

In some examples of the method, apparatuses, and non-transitory computer-readable medium described herein, the decrement value may be one and the threshold value may be zero.

DETAILED DESCRIPTION

Figure 1:
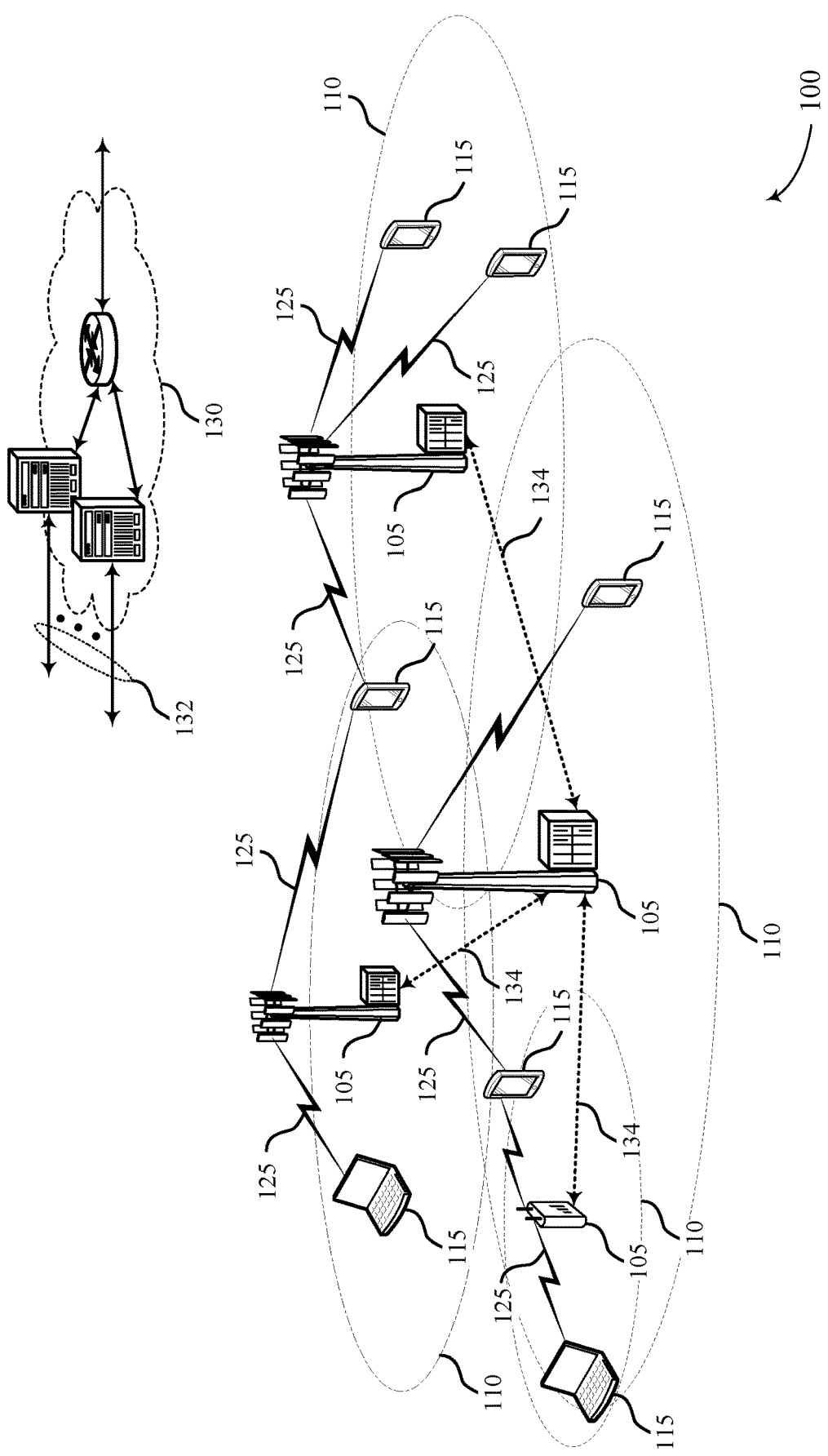
FIGS. 1 and 2 illustrate examples of wireless communications systems that support listen-before-talk (LBT) schemes for directional communications in accordance with aspects of the present disclosure.

In some wireless communications systems (e.g., a new radio (NR) system, a millimeter wave (mmW) system, etc.), wireless devices may communicate over a channel in a shared or unlicensed radio frequency spectrum band. To gain access to the channel, a wireless device (e.g., a user equipment (UE) or base station) may perform contention-based channel access. Contention-based channel access may allow a number of wireless devices to share the channel resources of the unlicensed radio frequency spectrum band. To limit interference and signal collision on the channel, the wireless devices may perform listen-before-talk (LBT) procedures to detect when the channel is clear for transmission. In an LBT procedure, if a device determines that the channel is clear of transmissions for a specific amount of time (e.g., based on a successful clear channel assessment (CCA)), the device may transmit over the channel using shared channel resources.

However, in some cases, the wireless device performing the LBT procedure may detect interference on the channel. In these cases, the interference source may occupy the channel and the directional transmission may block the wireless device from accessing the channel, resulting in significant latency for any transmissions sent over the channel by the wireless device. Further, in some cases, wireless devices may communicate using directional (e.g., beamformed) transmissions, and thus a level of interference observed by a device may depend on the direction and shape of a beam used by the device for communications as well as the direction and shape of any interfering signals. For example, the wireless device may perform an LBT procedure to transmit a message to a receiving device in a first direction but may determine that the channel is occupied due to a signal (e.g., directional interference) received in a second direction. Depending on the difference between the first and second directions, this directional interference blocking channel access for the wireless device may cause minimal or no interference to a directional transmission directed to the receiving device.

To mitigate the effects of directional interference and, correspondingly, reduce the latency involved in a contention-based channel access procedure, a wireless device may implement directional LBT. A directional LBT procedure may involve the wireless device monitoring the channel in a specific direction using a receive beam, which may reduce the effects of interference (directional or otherwise) over the channel. If a CCA passes for the channel using the receive beam, the wireless device may transmit on the channel using a transmit beam corresponding to the receive beam. For example, the transmit beam and receive beam may share a similar direction (e.g., within a threshold angle difference), a similar beam width (e.g., within a threshold width difference), or some combination of these or other beam parameters. Additionally or alternatively, the receive beam used for the CCA may span a directional range based on the direction and width of the receive beam, and the wireless device may transmit using any transmit beam within that directional range upon gaining access to the channel. In this way, the wireless device may use a wide beam for CCA, may gain access to the channel, and may transmit to multiple different devices using multiple narrow beams contained within the wide beam.

To further reduce latency for directional LBT, a wireless device may implement one or more directional LBT schemes for selecting and/or modifying the beams used for CCA. In a first example, the wireless device may implement a beam-shrinking scheme for directional LBT. Beam-shrinking may involve the wireless device starting an LBT procedure using a first beam (e.g., a wide beam). If a CCA fails for the first beam (e.g., due to directional interference), the device may switch the LBT procedure to a second beam different from (e.g., narrower than) the first beam. Depending on the direction of the interference source, the second beam may mitigate the interference and result in a successful LBT procedure. However, if the CCA fails for the second beam as well, the device may continue switching and/or narrowing the beam for LBT. For example, the device may select a third beam in a different direction than the second beam (e.g., still within the directional range of the first wide beam) or with an even narrower beam width than the second beam. In some cases, the device may halt an LBT procedure and restart with the first beam again if no other beam (e.g., no narrower beam) passes CCA or if a timer expires. When switching beams, the device may either update or maintain one or more parameters (e.g., a counter value, a contention window (CW) value, an initial countdown value, etc.) associated with the LBT procedure. The beam-shrinking scheme may support a device gaining access to the channel for a wide directional range if no interference is detected, while also supporting the device narrowing the directional range for channel access to avoid directional interference if directional interference is detected for a wider beam.

In a second example, the wireless device may implement a beam sweeping scheme for directional LBT. Beam sweeping may involve the wireless device performing concurrent LBT over multiple narrow beams. The device may implement a single counter for determining whether LBT is successful across the entire set of beams. In some cases, the device may identify a clear transmission time interval (TTI) (e.g., a slot, symbol, sub-slot, etc.) for each beam in turn before starting the shared counter. In other cases, the device may check for interference on the channel in a single TTI for all of the beams and may start the counter if the channel is clear for all of the beams. If interference is detected for any beam prior to the counter reaching zero, the CCA may fail for the entire set of beams. If any beam of the set of beams detects frequent or continuous interference, the device may drop that beam from the set of beams for the concurrent LBT procedure. The beam sweeping scheme may support a device gaining access to the channel using multiple narrow beams, supporting transmission to multiple devices if a single, combined LBT procedure is successful.

Aspects of the disclosure are initially described in the context of a wireless communications system. Additional aspects of the disclosure are described with respect to LBT schemes in wireless communications systems and process flows. Aspects of the disclosure are further illustrated by and described with reference to apparatus diagrams, system diagrams, and flowcharts that relate to LBT schemes for directional communications.

FIG. 1 illustrates an example of a wireless communications system 100 that supports LBT schemes for directional communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide re-transmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support re-transmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and re-transmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, wireless devices may communicate over a channel in a shared or unlicensed radio frequency spectrum band. Additionally, the wireless devices may implement directional communications, for example, using beamforming techniques. To gain access to the channel, a wireless device (e.g., a UE 115 or a base station 105) may perform an LBT procedure. In some cases, the wireless device performing the LBT procedure may detect interference on the channel, for example, due to a directional transmission by an interference source (e.g., another wireless device, such as another UE 115 or base station 105). In these cases, the interference source may occupy the channel and the directional transmission may block the wireless device from accessing the channel. For example, a base station 105 may perform an LBT procedure to transmit a message to a receiving UE 115 in a first direction but may determine that the channel is occupied due to a signal (e.g., directional interference) received in a second direction (e.g., from a second base station 105 or UE 115). Depending on the difference between the first and second directions, this directional interference may cause minimal or no interference to a directional transmission from the base station 105 to the receiving UE 115.

To improve the likelihood of a successful LBT procedure, a wireless device (e.g., the base station 105, a UE 115, etc.) may implement directional LBT. A directional LBT procedure may involve the base station 105 monitoring the channel in a specific direction using a receive beam, which may reduce the effects of directional interference over the channel. The base station 105 may additionally implement one or more directional LBT schemes for further reducing the latency involved in accessing the channel. In a beam-shrinking scheme for directional LBT, the base station 105 may start an LBT procedure using a wide beam. If a CCA fails for the wide beam (e.g., due to directional interference), the base station 105 may switch the LBT procedure to a narrower beam. Depending on the direction of the interference source, the narrower beam may not experience the interference and, accordingly, may result in a successful LBT procedure. In a beam-sweeping scheme for directional LBT, the base station 105 may perform concurrent LBT over multiple narrow beams. The base station 105 may implement a single counter for determining whether LBT is successful across the set of beams. If any beam of the set of beams detects frequent or continuous interference, the base station 105 may drop that beam from the set of beams for the concurrent LBT procedure. The LBT schemes for directional communications described herein may improve the success rates of directional LBT procedures, reduce the latency involved in accessing the channel and transmitting to a set of devices, or support some combination of these or other improvements for LBT procedures.

Figure 2:
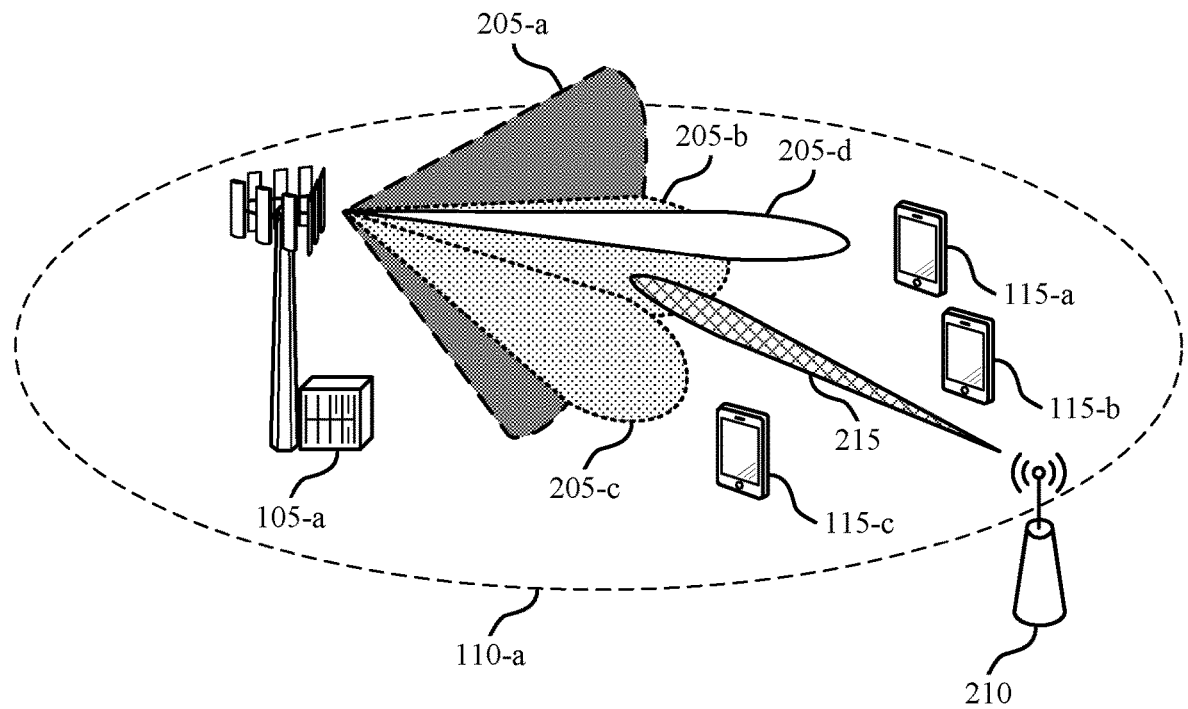

FIG. 2 illustrates an example of a wireless communications system 200 that supports LBT schemes for directional communications in accordance with aspects of the present disclosure. The wireless communications system 200 may include base station 105-*a* and UEs 115-*a*, 115-*b*, and 115-*c*, which may be examples of a base station 105 and UEs 115 as described with reference to FIG. 1. Base station 105-*a* may serve a geographic coverage area 110-*a*. In some cases, as illustrated, base station 105-*a* may implement a beam-shrinking—or beam-changing—scheme for performing a directional LBT procedure. For example, base station 105-*a* may perform the directional LBT procedure to gain access to a channel for transmission to one or more UEs 115. Additionally or alternatively, other wireless devices, such as UEs 115-*a*, 115-*b*, 115-*c*, or some combination of these UEs 115, may implement beam-shrinking, beam-sweeping, or both for a channel access procedure.

The wireless communications system 200 may support wireless devices (e.g., base station 105-*a* and UEs 115-*a*, 115-*b*, and 115-*c*) operating in a shared or unlicensed radio frequency spectrum band. For example, the wireless devices may contend for access to an unlicensed frequency band, such as the 2.4 GHz band, the 5 GHz band, or any other unlicensed frequency band (e.g., an unlicensed higher band) supported by the wireless communications system 200. To support fair sharing of an unlicensed frequency band, wireless devices may perform contention-based channel access procedures to gain access to resources (e.g., time resources, frequency resources, etc.) in the unlicensed frequency band. In some cases, a contention-based channel access procedure may be configured at the wireless devices based on a regulation (e.g., a network regulation according to geographic, national, or international regulations) and/or to support coexistence.

For example, the wireless communications system 200 may support directional LBT procedures for channel access.

In some cases, directional LBT may improve a probability of channel access as compared to non-directional LBT. Additionally or alternatively, directional LBT may reduce the probability of causing interference to other devices in the wireless communications system 200 (e.g., as compared to non-directional LBT). In some cases, wireless devices may operate according to one or more schemes for directional LBT. For example, base station 105-*a*, UE 115-*a*, UE 115-*b*, UE 115-*c*, or some combination of these devices may implement beam-shrinking for directional LBT, beam-sweeping for directional LBT, or some combination of these techniques to reduce the latency involved in gaining access to an unlicensed radio frequency spectrum band.

As illustrated, base station 105-*a* may implement beam-shrinking-based channel access. In a directional LBT procedure, the beam width used for checking the channel may be important in determining the amount of interference that is detected by the device performing the LBT. For example, a larger beam width may result in detection of more interference than a smaller beam width. In some cases (e.g., if the interference is beamformed in an interference beam 215), a narrower beam may detect more or less interference than a wider beam based on the direction of the narrower beam and the direction of the interference beam 215.

For example, a wide beam 205-*a* may detect beamformed interference from a wide range of directions. If an interference source 210 transmits a signal using an interference beam 215, the wide beam 205-*a* may detect the interference. However, narrower beams, such as beams 205-*b* and 205-*c*, may experience more or less interference due to the interference beam 215. For example, based on the direction of the interference beam 215 and the beams 205-*b* and 205-*c*, beam 205-*b* may detect more interference than wide beam 205-*a*, while beam 205-*c* may detect less interference (e.g., minimal or no interference) than wide beam 205-*a*.

Implementing beam-shrinking may allow base station 105-*a* to transmit to UEs 115-*a*, 115-*b*, and 115-*c* on a channel using an unlicensed radio frequency spectrum band. For beam-shrinking, base station 105-*a* may start an LBT procedure on a wide beam 205-*a*. In some cases, base station 105-*a* may select a wide beam 205-*a* that can be used to transmit to all of the UEs 115-*a*, 115-*b*, and 115-*c* with pending information for transmission. The LBT procedure may be an example of a category 2 LBT procedure, a category 3 LBT procedure, a category 4 LBT procedure, or any other type of LBT procedure. For the LBT procedure, base station 105-*a* may perform CCA for the channel using the beam 205-*a*. For example, base station 105-*a* may monitor the channel using the beam 205-*a*. Base station 105-*a* may start a countdown from a countdown value for beam 205-*a* while the channel is determined to be clear for beam 205-*a*. This countdown value may be pre-configured or random and may correspond to the CCA observation time. Base station 105-*a* may consider the channel "clear" if an energy level detected in the channel using beam 205-*a* is less than or equal to a threshold value (e.g., a pre-configured, semi-static, or dynamic threshold value). For each TTI (e.g., slot, sub-slot, symbol, etc.) that the channel remains clear for beam 205-*a*, base station 105-*a* may decrease the counter by one. If the counter reaches zero while the channel remains clear, base station 105-*a* may transmit the message or messages over the channel using the beam 205-*a* or a similar or nested beam. For example, base station 105-*a* may transmit to one or more of the UEs 115 using a transmit beam 205-*a* with a similar direction and beam width (e.g., within some difference threshold) as the beam 205-*a* used for the directional LBT procedure or may transmit to one or more UEs 115 (e.g., UE 115-*a*) using a beam contained within the beam 205-*a* used for directional LBT. For example, base station 105-*a* may contend for the channel using beam 205-*a* and, upon gaining access to the channel, may transmit to UE 115-*a* using narrow beam 205-*d*.

In some cases, the CCA may not pass for the first beam 205-*a* used for the directional LBT procedure. For example, base station 105-*a* may detect interference from an interference source 210 based on a signal transmitted on an interference beam 215. If base station 105-*a* determines that the channel is occupied (e.g., based on the interference) during the countdown using beam 205-*a*, base station 105-*a* may determine to switch beams 205 for the LBT procedure. For example, base station 105-*a* may select a different beam from the first beam 205-*a* used for the LBT procedure. In some cases, base station 105-*a* may select a narrower beam 205-*b* for the LBT procedure. Base station 105-*a* may determine the parameters for this second beam 205-*b* based on a location of one or more UEs 115. For example, beam 205-*b* may support transmission to UE 115-*a* and UE 115-*b*. Base station 105-*a* may perform CCA for the channel using beam 205-*b*. Selecting a beam 205 for LBT may involve base station 105-*a* selecting a beam 205 from a set of supported beams or selecting one or more beamforming parameters from a set of supported beamforming parameters. For example, base station 105-*a* may perform phase shifting, antenna activation and/or deactivation, precoding, or some combination thereof based on a selected beam or set of beamforming parameters. In some cases, base station 105-*a* may implement a set of rules to select a beam 205 for LBT. For example, if beam 205-*a* detects interference, base station 105-*a* may select beam 205-*b* for a further LBT procedure based on the beam 205-*a*, the target UEs 115, the detected interference, or some combination thereof.

In some cases, when base station 105-*a* switches from beam 205-*a* to beam 205-*b*, base station 105-*a* may continue with the current counter for CCA. In other cases, base station 105-*a* may restart with a new counter for CCA using beam 205-*b*. In yet other cases, base station 105-*a* may modify the current counter (e.g., base station 105-*a* may apply a static or dynamic penalty value to the counter value) and use the modified counter for CCA using beam 205-*b*. For example, base station 105-*a* may add a penalty value (e.g., 5) to the counter value when switching from beam 205-*a* to beam 205-*b*.

Base station 105-*a* may additionally or alternatively continue with or modify other parameters associated with the LBT procedure when switching beams in a beam-shrinking scheme. For example, base station 105-*a* may determine a CW value for CCA using the first beam 205-*a*. In some cases, when switching to beam 205-*b* for LBT, base station 105-*a* may not change the CW value. In other cases, when switching to beam 205-*b*, base station 105-*a* may update the CW value. For example, base station 105-*a* may increase (e.g., double) the CW value or may decrease (e.g., half) the CW value used for beam 205-*b* as compared to the CW value used for beam 205-*a*. In some cases, the change to the CW value may be based on a comparison between the first beam 205-*a* and the second beam 205-*b*.

Additionally or alternatively, base station 105-*a* may determine a countdown value for CCA. The countdown value may be randomly or pseudo-randomly selected from a range of values, where the range of values spans from a minimum value (e.g., 15 ms) to the CW value. In some cases, when switching to beam 205-*b* for LBT, base station 105-*a* may use the same randomly selected countdown value for CCA, and base station 105-*a* may or may not restart the counter from this countdown value. In some other cases, base station 105-*a* may update the countdown value (e.g., select another random or pseudo-random value from the range of values) for CCA using beam 205-*b*. For example, if base station 105-*a* updates the CW value when switching from the first beam 205-*a* to the second beam 205-*b*, base station 105-*a* may additionally select a new random countdown value from the range defined by the updated CW value and may restart the counter for CCA at this new random countdown value.

If CCA passes for beam 205-*b*, base station 105-*a* may transmit one or more messages based on the successful LBT procedure. In some examples, base station 105-*a* may perform an additional LBT procedure to transmit a message to any UEs 115 not covered by beam 205-*b*. For example, if base station 105-*a* successfully contends for the channel using beam 205-*b*, base station 105-*a* may transmit to UEs 115-*a* and 115-*b* within the range of beam 205-*b*. Base station 105-*a* may additionally contend for the channel using beam 205-*c* in order to transmit to UE 115-*c*, as UE 115-*c* may not be covered by beam 205-*b*.

If CCA fails for beam 205-*b* (e.g., beam 205-*b* may experience interference from interference beam 215 during the countdown before the counter reaches zero), base station 105-*a* may switch to a third beam 205 for the LBT procedure. In some cases, base station 105-*a* may switch from beam 205-*b* to beam 205-*c* (e.g., a beam with a similar beam width but pointing in a different direction). Base station 105-*a* may perform CCA for the channel using beam 205-*c* in order to transmit to UE 115-*c*. In other cases, base station 105-*a* may switch from beam 205-*b* (or from beam 205-*c*) to beam 205-*d*, which may be a further narrower beam than beam 205-*b*. Base station 105-*a* may perform CCA for the channel using beam 205-*d* in order to transmit to UE 115-*a*. Base station 105-*a* may repeat the beam-shrinking procedure with any number of UEs 115, beams 205, beam widths, beam directions, or any combination of these. In some cases, if no beam 205 passes CCA, base station 105-*a* may halt the LBT procedure (e.g., stop the countdown) and restart the LBT procedure with a wide beam once again (e.g., wide beam 205-*a*). Base station 105-*a* may determine to restart the process if no narrower beam 205 without interference is found, or if a timer for the beam-shrinking scheme expires.

In some cases, when base station 105-*a* gains access to the channel, base station 105-*a* may transmit one or more signals on the channel based on the beam 205 used for the directional LBT procedure. For example, if base station 105-*a* passes CCA using beam 205-*c*, base station 105-*a* may transmit to UE 115-*c* using a channel occupancy time (COT) duration that is based on the beam width of beam 205-*c*. Base station 105-*a* may be configured with a function that calculates COT duration based on beam width (e.g., among other factors).

As described herein, base station 105-*a* may perform beam-shrinking for directional LBT. However, it is to be understood that other wireless devices (e.g., UEs 115) may perform beam-shrinking for directional LBT. Furthermore, wireless devices may implement beam-shrinking techniques for other procedures. For example, a wireless device may use a similar beam-shrinking procedure if an error is reported after a transmission. Specifically, if UE 115-*a* transmits a message to base station 105-*a* using a first transmit beam and receives a negative acknowledgment message in response (e.g., as part of a HARQ procedure), UE 115-*a* may select a different beam (e.g., a narrower beam) for re-transmission of the message.

Figure 3:
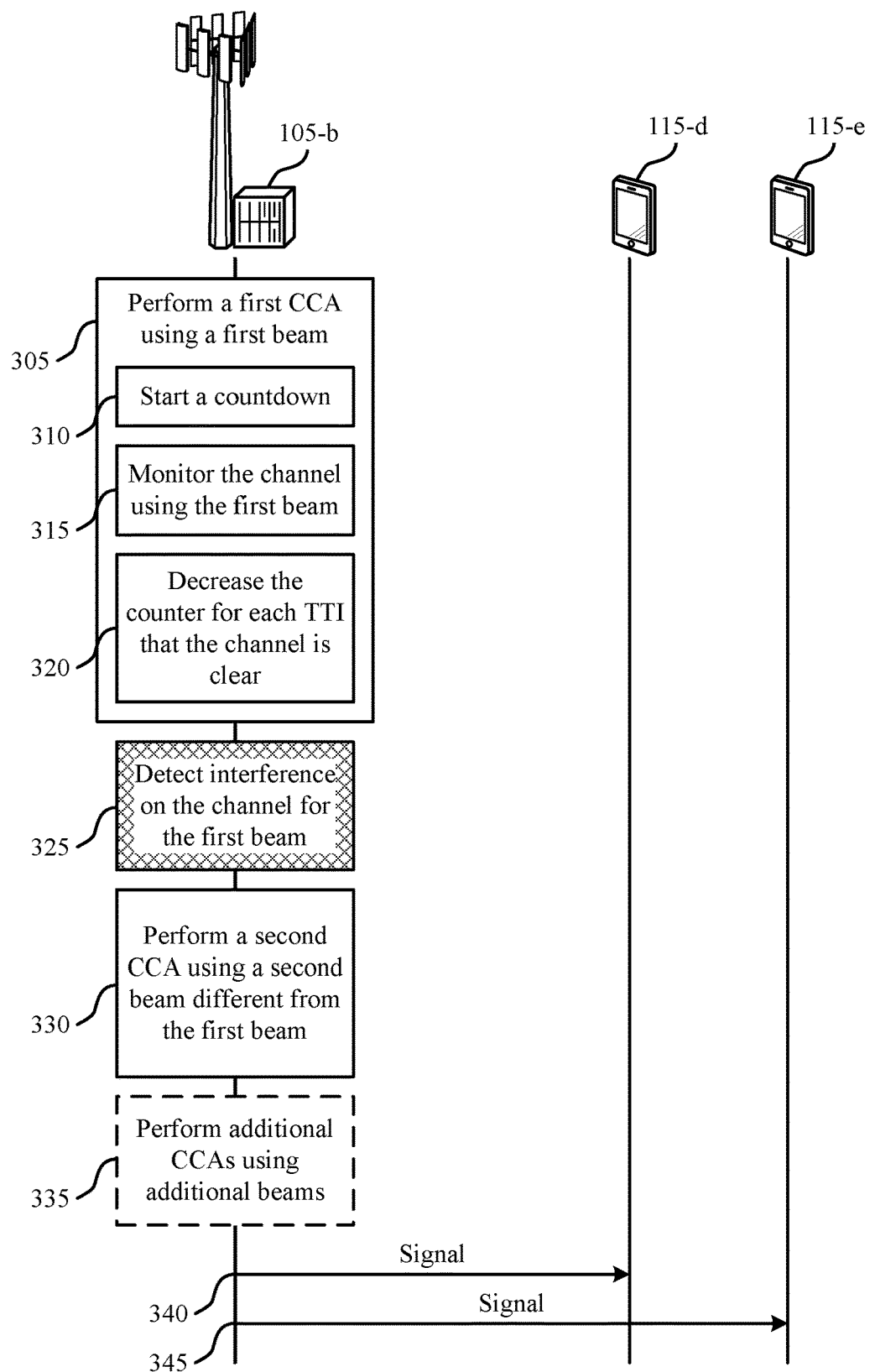
FIG. 3 illustrates an example of a process flow that supports LBT schemes for directional communications in accordance with aspects of the present disclosure.

FIG. 3 illustrates an example of a process flow 300 that supports LBT schemes for directional communications in accordance with aspects of the present disclosure. The process flow 300 may illustrate an example beam-shrinking scheme for gaining access to a channel. For example, base station 105-b may perform a beam-shrinking LBT procedure to transmit signals to UEs 115-d and 115-e. Base station 105-b and UEs 115-d and 115-e may be examples of the corresponding wireless devices described with reference to FIGS. 1 and 2. In some cases, instead of base station 105-b implementing the beam-shrinking scheme for channel access, a different type of wireless device (e.g., a UE 115) may perform beam-shrinking LBT. Alternative examples of the following may be implemented, where some steps are performed in a different order than described or are not performed at all. In some cases, steps may include additional features not mentioned below, or further steps may be added.

At 305, base station 105-b may perform a first CCA for a channel using a first beam. The first beam may have a first beam width. In some cases, the first CCA may involve a number of procedures for attempting to gain access to the channel. For example, base station 105-b may select a countdown value for the first beam from a range of countdown values, where a maximum countdown value of the range corresponds to a CW value for the first beam. The countdown value may be a random number selected from the range of values (e.g., according to a random or pseudorandom number generation process).

At 310, base station 105-b may start a counter from the selected countdown value for the first beam. At 315, base station 105-b may monitor the channel using the first beam (e.g., where the start of the counter and the start of the monitoring procedure align in time). For example, the monitoring may trigger the start of the counter, or vice versa. At 320, base station 105-b may decrease the counter by a decrement value (e.g., one) for each TTI (e.g., slot, sub-slot, or symbol) that the channel is determined to be clear for the first beam. For example, if, based on the monitoring with the first beam, base station 105-b detects an energy level for the channel less than or equal to an energy level threshold, base station 105-b may determine that the channel is clear (e.g., unoccupied) for the first beam. If the counter reaches a threshold value (e.g., zero) without base station 105-b detecting interference on the channel for the first beam, the first CCA may pass, and base station 105-b may gain access to the channel using the first beam.

However, in some cases, base station 105-b may detect interference on the channel for the first beam at 325. Base station 105-b may detect the interference (e.g., based on a directional transmission from an interference source) during the first CCA prior to the counter reaching zero.

Based on detecting the interference on the first beam, base station 105-b may switch to a second beam for the LBT process. For example, at 330, base station 105-b may perform a second CCA for the channel using the second beam. The second beam may have a second beam width that is narrower than the first beam width. The second CCA may include similar processes as the first CCA. In some cases, based on switching from the first beam to the second beam for the LBT procedure, base station 105-b may maintain or update one or more CCA parameters. For example, base station 105-b may continue with the current counter, restart with a new counter, or modify the counter value based on a penalty value. Additionally or alternatively, base station 105-b may maintain or update the CW value, the selected countdown value, or some combination of these.

In some cases, the second CCA may also fail (e.g., due to interference on the channel for the second beam). In these cases, at 335, base station 105-b may perform one or more additional CCAs using one or more additional beams until a CCA passes or the LBT procedure is abandoned. For example, base station 105-b may perform an additional CCA using a beam with a different beam direction than the second beam, may perform an additional CCA using a beam with a narrower beam width than the second beam, or both. If base station 105-b halts the LBT process (e.g., based on not identifying any beam free from interference or based on a timer expiring), base station 105-b may restart a new LBT process (e.g., using a wide beam).

Once a CCA passes for the channel, base station 105-b may gain access to the channel and may transmit to one or more UEs 115 in the unlicensed radio frequency spectrum band. For example, at 340, base station 105-b may transmit a signal over the channel to UE 115-d using the beam that passed the CCA (e.g., a beam corresponding to the beam that passed CCA). In some cases, at 345 (or also at 340), base station 105-b may additionally transmit a signal over the channel to UE 115-e using the beam that passed the CCA (e.g., a beam corresponding to the beam that passed CCA). For example, if a wide beam covering both UE 115-d and 115-e passes LBT, base station 105-b may transmit to UE 115-d using a first narrow beam and to UE 115-e using a second narrow beam that are both contained within the wide beam, or base station 105-b may transmit to UE 115-d and UE 115-e using the wide beam. In some cases, base station 105-b may transmit according to a COT duration that is based on the beam width for the beam that passed CCA.

Figure 4:
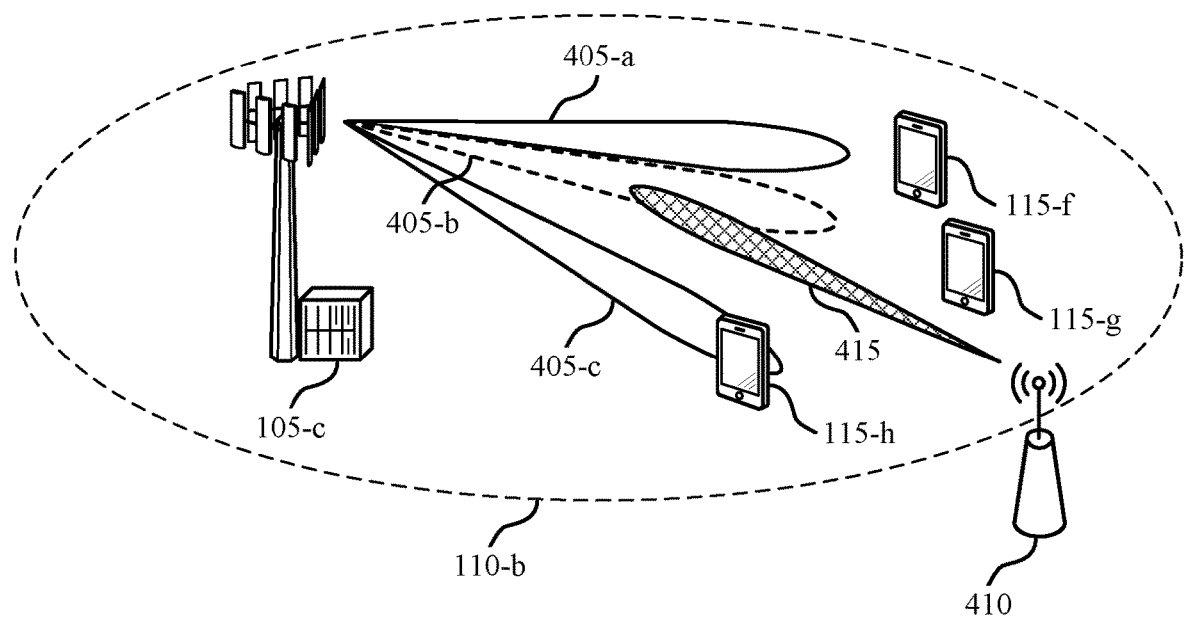
FIG. 4 illustrates an example of a wireless communications system that supports LBT schemes for directional communications in accordance with aspects of the present disclosure.

FIG. 4 illustrates an example of a wireless communications system 400 that supports LBT schemes for directional communications in accordance with aspects of the present disclosure. The wireless communications system 400 may include base station 105-c and UEs 115-f, 115-g, and 115-h, which may be examples of a base station 105 and UEs 115 as described with reference to FIGS. 1 through 3. Base station 105-c may serve a geographic coverage area 110-b. In some cases, as illustrated, base station 105-c may implement a beam-sweeping scheme for performing a directional LBT procedure. For example, base station 105-c may perform the directional LBT procedure to gain access to a channel for transmission to one or more UEs 115. Additionally or alternatively, other wireless devices, such as UEs 115-f, 115-g, 115-h, or some combination of these UEs 115, may implement beam-sweeping, beam-shrinking, or both for a channel access procedure.

As illustrated, base station 105-c may implement beam-sweeping-based channel access. A beam-sweeping LBT scheme may involve base station 105-c performing LBT concurrently over multiple beams 405. For example, base station 105-c may repeatedly sweep through the beams in a beam set (e.g., in a round-robin fashion, from beam 405-a to beam 405-b to beam 405-c and back to beam 405-a). By selecting narrow beams 405 for transmission, base station 105-c may limit the effects of directional interference. For example, interference due to a signal transmitted by interference source 410 in interference beam 415 may not affect one or more of the selected beams 405 based on the beam widths for the beams 405.

In some cases, base station 105-c may perform beam-sweeping LBT by staying on each beam 405 in the set of beams until a clear TTI (e.g., an empty slot) is identified. For example, base station 105-c may contend for access to a channel in an unlicensed radio frequency spectrum band in order to transmit to UEs 115-f, 115-g, and 115-h. Base station 105-*c* may determine a set of beams for transmitting to this set of UEs 115. For example, base station 105-*c* may select beam 405-*a* to transmit to UE 115-*f*, beam 405-*b* to transmit to UE 115-*g*, and beam 405-*c* to transmit to UE 115-*h*. Base station 105-*c* may monitor the channel using beam 405-*a* until base station 105-*c* determines that the channel is clear for beam 405-*a*, for example, based on an energy level for the channel being less than or equal to an energy level threshold. In some cases, the energy level threshold may be based on the width of a selected beam 405. Once base station 105-*c* detects a TTI for which the channel is clear using beam 405-*a*, base station 105-*c* may switch to monitoring the channel using beam 405-*b*. Base station 105-*c* may continue this process until base station 105-*c* has detected a clear TTI (e.g., an empty slot, sub-slot, symbol, etc.) for each beam 405 in the set of beams. Base station 105-*c* may then start a CCA countdown for the set of beams. If the counter reaches zero without base station 105-*c* detecting interference on any of the beams 405, base station 105-*c* may gain access to the channel and may transmit on beams corresponding to one or more of the beams 405 in the beam set. For example, if the beam-sweeping LBT is performed using beams 405-*a*, 405-*b*, and 405-*c*, base station 105-*c* may transmit signals to UEs 115-*f*, 115-*g*, and 115-*h* using transmit beams corresponding to the respective beams 405-*a*, 405-*b*, and 405-*c*.

In some other cases, base station 105-*c* may check a single TTI (e.g., one slot) across each beam 405 in the set (e.g., rather than staying on each beam in turn) to determine if the channel is clear for the set of beams. For example, for a first TTI, base station 105-*c* may monitor the channel using beam 405-*a*, beam 405-*b*, and beam 405-*c*. If each beam 405 determines that the channel is clear (e.g., each beam 405 detects an empty slot), base station 105-*c* may start the CCA countdown for the set of beams. However, if any beam 405 of the set of beams determines that the channel is occupied for that beam, base station 105-*c* may not perform the countdown. In some cases, base station 105-*c* may perform a backoff procedure (e.g., for a random or pseudo-random length of time) before checking one TTI again. If base station 105-*c* identifies that the channel is clear for all of the beams 405 in a TTI (e.g., a slot, sub-slot, or symbol), and base station 105-*c* completes the CCA countdown without detecting interference for any of the beams 405, base station 105-*c* may gain access to the channel and transmit using one or more beams corresponding to the set of beams that passed CCA.

Performing concurrent LBT across a set of beams 405 may improve detection of interference. For example, using a shared CCA countdown across the set of beams 405 may capture interference better than performing a separate countdown for each beam in turn. Additionally, in some cases, the concurrent LBT for the set of beams 405 may improve the latency involved with gaining access to the channel for transmitting to a set of wireless devices.

In some cases, base station 105-*c* may detect interference while performing the shared countdown for the set of beams. In one example, the CCA may fail for the entire set of beams if interference is detected on one beam (e.g., beam 405-*b* due to interference beam 415). In another example, the CCA countdown may continue, but the beam experiencing interference may be dropped from the LBT procedure. If a beam 405 experiences persistent interference (e.g., frequent interference or continuous interference for X TTIs or slots, where X may be configured or dynamically determined), base station 105-*c* may halt the LBT procedure based on the persistent interference. In other cases, if a beam 405 experiences persistent interference, base station 105-*c* may drop the beam 405 from the LBT procedure. Base station 105-*c* may either restart the LBT procedure with a subset of beams excluding the dropped beam 405 or may continue the LBT procedure without further consideration to the dropped beam 405 for decreasing the counter or transmitting in the channel. For example, base station 105-*c* may experience frequent interference (e.g., the channel is occupied for Y TTIs or slots within a specific time frame) from an interference source 410 on beam 405-*b*. Rather than frequently fail LBT for the entire set of beams (e.g., beam 405-*a*, beam 405-*b*, and beam 405-*c*) based on beam 405-*b*, base station 105-*c* may drop beam 405-*b* from the set of beams for the LBT procedure. If base station 105-*c* passes beam-sweeping LBT for the remaining set of beams, base station 105-*c* may gain access to the channel for a transmission opportunity (TxOp). Base station 105-*c* may use beams corresponding to beams 405-*a* and 405-*c* for transmission based on the successful LBT procedure, but base station 105-*c* may not use a beam corresponding to beam 405-*b* based on dropping beam 405-*b* from the LBT procedure.

As described herein, base station 105-*c* may perform beam-sweeping for directional LBT. However, it is to be understood that other wireless devices (e.g., UEs 115) may perform beam-sweeping for directional LBT. Furthermore, wireless devices may implement beam-sweeping techniques for other procedures. Additionally or alternatively, wireless devices may implement any combination of beam-shrinking, beam-sweeping, or other LBT schemes for contention-based channel access in a wireless communications system.

Figure 5:
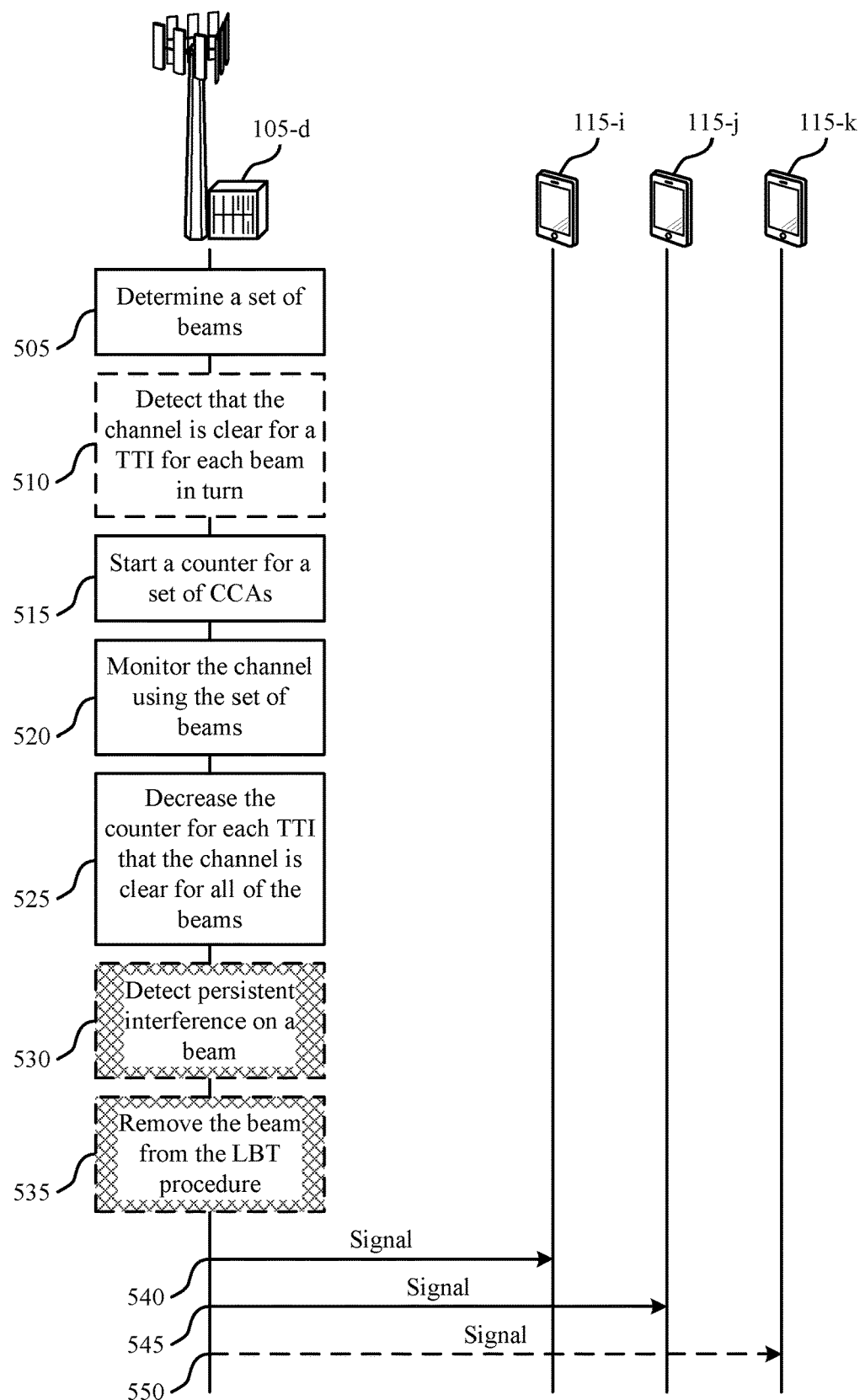
FIG. 5 illustrates an example of a process flow that supports LBT schemes for directional communications in accordance with aspects of the present disclosure.

FIG. 5 illustrates an example of a process flow 500 that supports LBT schemes for directional communications in accordance with aspects of the present disclosure. The process flow 500 may illustrate an example beam-sweeping scheme for gaining access to a channel. For example, base station 105-*d* may perform a beam-sweeping LBT procedure to transmit signals to UEs 115-*i*, 115-*j*, and 115-*k*. Base station 105-*d* and UEs 115-*i*, 115-*j*, and 115-*k* may be examples of the corresponding wireless devices described with reference to FIGS. 1 through 4. In some cases, instead of base station 105-*d* implementing the beam-sweeping scheme for channel access, a different type of wireless device (e.g., a UE 115) may perform beam-sweeping LBT. Alternative examples of the following may be implemented, where some steps are performed in a different order than described or are not performed at all. In some cases, steps may include additional features not mentioned below, or further steps may be added.

At 505, base station 105-*d* may determine a set of beams for performing an LBT procedure. The set of beams may correspond to a set of UEs 115 with transmissions pending at base station 105-*d*. For example, the set of beams may include a first beam directed to UE 115-*i*, a second beam directed to UE 115-*j*, and a third beam directed to UE 115-*k*. The beams may be examples of narrow beams (e.g., with beam widths below a beam width threshold).

In some cases, at 510, base station 105-*d* may detect that the channel is clear for a TTI for each beam. In some cases, base station 105-*d* may check each beam in turn, monitoring the channel using one beam until the channel is determined to be clear before switching to monitoring using a next beam. In some other cases, base station 105-*d* may check a single TTI (e.g., a single slot) across all of the beams in the set of beams.

At 515, base station 105-*d* may start a counter for a set of CCAs for the channel, where each CCA is performed using a respective beam of the set of beams. The counter may be a shared counter for all of the beams in the LBT procedure (e.g., to reduce processing resources used at base station 105-*d* to keep track of the LBT counts). In some cases, base station 105-*d* may start the counter based on detecting that the channel is clear for all of the beams in the set (e.g., according to one of the approaches described with respect to 510). At 520, base station 105-*d* may monitor the channel using the set of beams based on starting the counter.

At 525, base station 105-*d* may decrease the counter by a decrement value (e.g., one) for each TTI (e.g., slot, sub-slot, symbol, etc.) that the channel is determined to be clear for each beam of the set of beams. The counter may start at a randomly or pseudo-randomly selected countdown value and, if the counter reaches a threshold value (e.g., zero) without a beam detecting interference on the channel, the LBT procedure may pass for the set of beams.

In some cases, a beam may detect that the channel is occupied for that beam during the countdown. In a first example, the LBT procedure may fail and base station 105-*d* may backoff for an amount of time before restarting an LBT procedure. In a second example, base station 105-*d* may drop the beam that detected interference from the set of beams in the LBT procedure and may continue the countdown for the remaining beams.

At 530, in some cases, base station 105-*d* may detect persistent interference on a beam. For example, base station 105-*d* may detect interference on the channel for a beam of the set of beams for a threshold number of contiguous TTIs or for a threshold number of TTIs within a specific time duration. At 535, base station 105-*d* may remove the beam from the set of beams based on the detected interference. Base station 105-*d* may either continue LBT with the remaining beams or may restart LBT (e.g., restart the counter) with the remaining beams.

If the counter reaches zero, base station 105-*d* may gain access to the channel and may transmit one or more signals over the channel using one or more beams of the remaining beams in the set of beams. For example, at 540, base station 105-*d* may transmit a signal to UE 115-*i* using a first beam of the set of beams. At 545 (or at 540), base station 105-*d* may additionally transmit a signal to UE 115-*j* using a second beam of the set of beams. If a third beam corresponding to UE 115-*k* passed the LBT in the set of beams, base station 105-*d* may transmit a signal using the third beam to UE 115-*k* at 550 (or at 540). However, if the third beam was dropped from the set of beams (e.g., based on interference detected by the third beam), base station 105-*d* may not use the third beam on the channel during the TxOp resulting from the successful LBT procedure. Additionally or alternatively, in some implementations, one or more aspects related to beam-shrinking LBT may be combined with one or more aspects related to beam-sweeping LBT.

Figure 6:
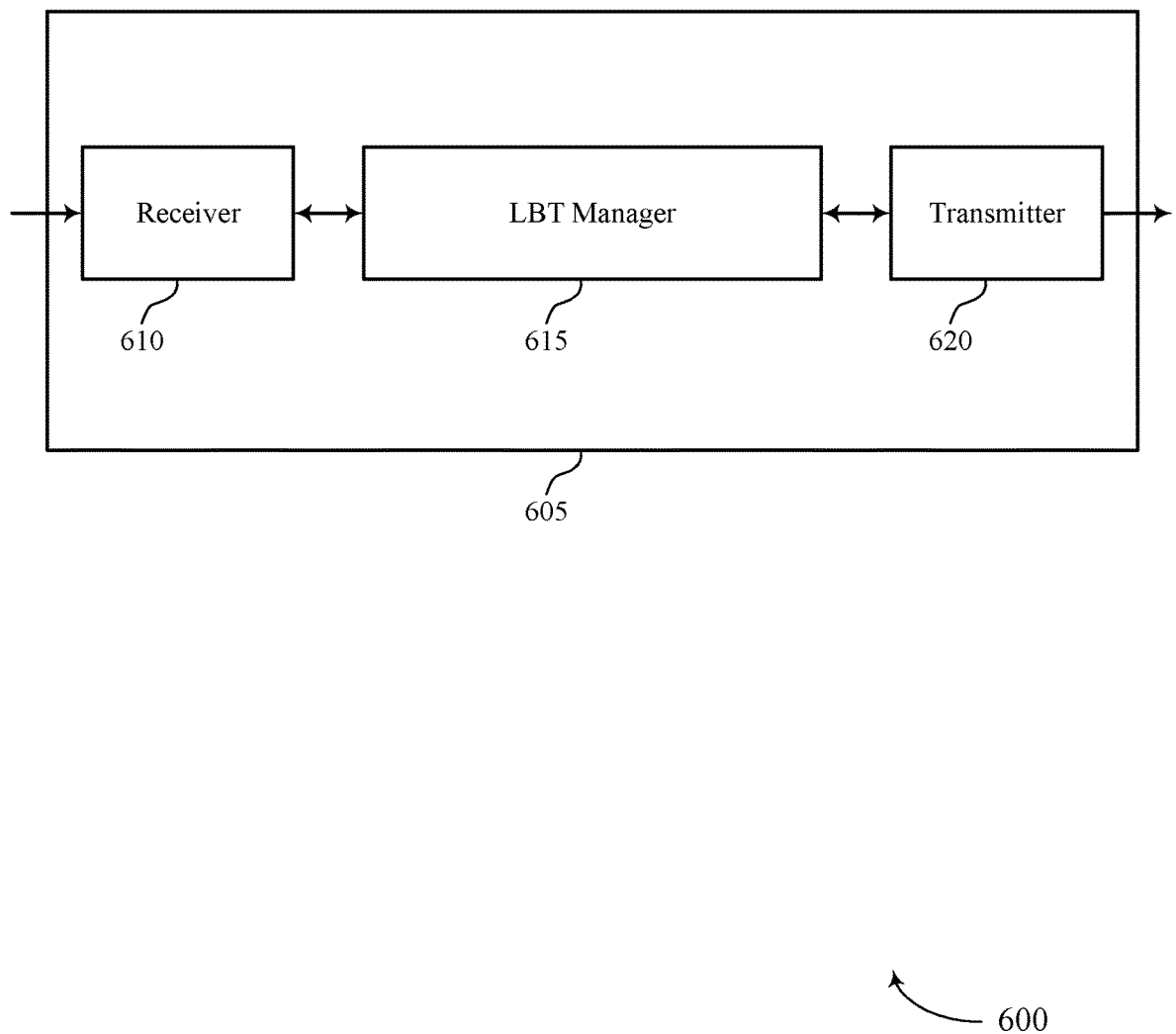
FIGS. 6 and 7 show block diagrams of devices that support LBT schemes for directional communications in accordance with aspects of the present disclosure.

FIG. 6 shows a block diagram 600 of a device 605 that supports LBT schemes for directional communications in accordance with aspects of the present disclosure. The device 605 may be an example of aspects of a UE 115 or base station 105 as described herein. The device 605 may include a receiver 610, an LBT manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to LBT schemes for directional communications, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

In some cases, the LBT manager 615 may perform a first CCA for a channel using a first beam, detect interference for the first beam on the channel based on the first CCA, and perform a second CCA for the channel using a second beam based on the detected interference for the first beam, where the second beam is different from the first beam. Additionally or alternatively, the LBT manager 615 may start a counter for a set of CCAs for a channel, where each CCA of the set of CCAs is performed using a respective beam of a set of beams, monitor the channel using the set of beams based on starting the counter, decrease the counter by a decrement value for each TTI that the channel is determined to be clear for each beam of the set of beams based on the monitoring, and transmit one or more signals over the channel using one or more beams of the set of beams based on the counter reaching a threshold value. The LBT manager 615 may be an example of aspects of the LBT manager 910 or 1010 as described herein.

The actions performed by the LBT manager 615 as described herein may be implemented to realize one or more potential advantages. For example, performing directional LBT may allow a wireless device (e.g., a UE 115, a base station 105, etc.) to reduce the latency involved in gaining access to a shared channel for a directional transmission. For example, performing a CCA using a first beam, detecting interference for the first beam, and switching to a second beam may improve the likelihood of a wireless device completing a successful CCA (e.g., if the beam width, beam direction, or both for the second beam allows the wireless device to avoid a directional interfering signal). Additionally or alternatively, performing concurrent LBT for multiple beams may allow a wireless device to complete successful CCA for a number of different narrow beams, improving the latency involved in transmitting to a number of different devices over the shared channel.

Based on performing directional LBT, a processor of the wireless device (e.g., a processor controlling the receiver 610, the LBT manager 615, the transmitter 620, etc.) may reduce processing resources used for transmitting on a shared or unlicensed radio frequency spectrum band. By performing directional CCAs—for example, in a beam-shrinking procedure, a beam-sweeping procedure, or both—the wireless device may mitigate the effects of directional interference, allowing the wireless device to gain access to the channel more quickly (and with fewer LBT procedures) than if the device were to perform non-directional CCA. Reducing the number of LBT procedures may reduce a number of times the processor ramps up processing power and turns on processing units to gain access to the channel.

The LBT manager 615, or its sub-components, may be implemented in hardware, code (e.g., software or firmware) executed by a processor, or any combination thereof. If implemented in code executed by a processor, the functions of the LBT manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The LBT manager 615, or its sub-components, may be physically located at various positions, including being distributed such that portions of functions are implemented at different physical locations by one or more physical components. In some examples, the LBT manager 615, or its sub-components, may be a separate and distinct component in accordance with various aspects of the present disclosure. In some examples, the LBT manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
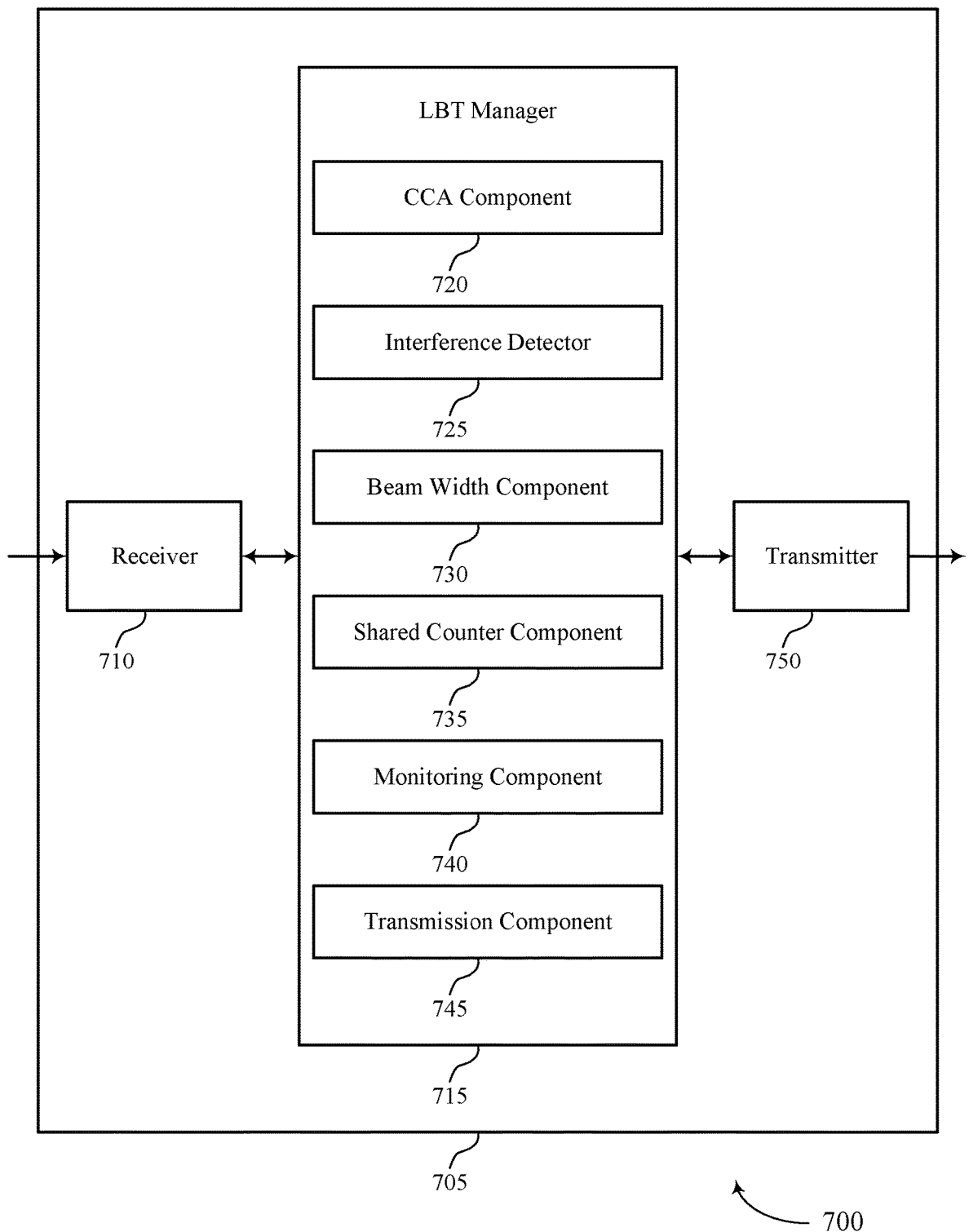

FIG. 7 shows a block diagram 700 of a device 705 that supports LBT schemes for directional communications in accordance with aspects of the present disclosure. The device 705 may be an example of aspects of a device 605, a UE 115, or a base station 105 as described herein. The device 705 may include a receiver 710, an LBT manager 715, and a transmitter 750. The device 705 may also include a processor. Each of these components may be in communication with one another (e.g., via one or more buses).

Receiver 710 may receive information such as packets, user data, or control information associated with various information channels (e.g., control channels, data channels, and information related to LBT schemes for directional communications, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The LBT manager 715 may be an example of aspects of the LBT manager 615 as described herein. The LBT manager 715 may include a CCA component 720, an interference detector 725, a beam width component 730, a shared counter component 735, a monitoring component 740, a transmission component 745, or any combination of these or other components. The LBT manager 715 may be an example of aspects of the LBT manager 910 or 1010 as described herein.

In a first example, the CCA component 720 may perform a first CCA for a channel using a first beam. The interference detector 725 may detect interference for the first beam on the channel based on the first CCA. The CCA component 720 may perform a second CCA for the channel using a second beam based on the detected interference for the first beam, where the second beam is different from the first beam. In some cases, the beam width component 730 may select the first beam with a first beam width and may select the second beam with a second beam width that is narrower than the first beam width.

In a second example, the shared counter component 735 may start a counter for a set of CCAs for a channel, where each CCA of the set of CCAs is performed using a respective beam of a set of beams. The monitoring component 740 may monitor the channel using the set of beams based on starting the counter. The shared counter component 735 may decrease the counter by a decrement value for each TTI that the channel is determined to be clear for each beam of the set of beams based on the monitoring. The transmission component 745 may transmit one or more signals over the channel using one or more beams of the set of beams based on the counter reaching a threshold value.

Transmitter 750 may transmit signals generated by other components of the device 705. In some examples, the transmitter 750 may be collocated with a receiver 710 in a transceiver module. For example, the transmitter 750 may be an example of aspects of the transceiver 920 or 1020 as described with reference to FIGS. 9 and 10. The transmitter 750 may utilize a single antenna or a set of antennas. In some cases, the transmission component 745 may be a component of the transmitter 750.

Figure 8:
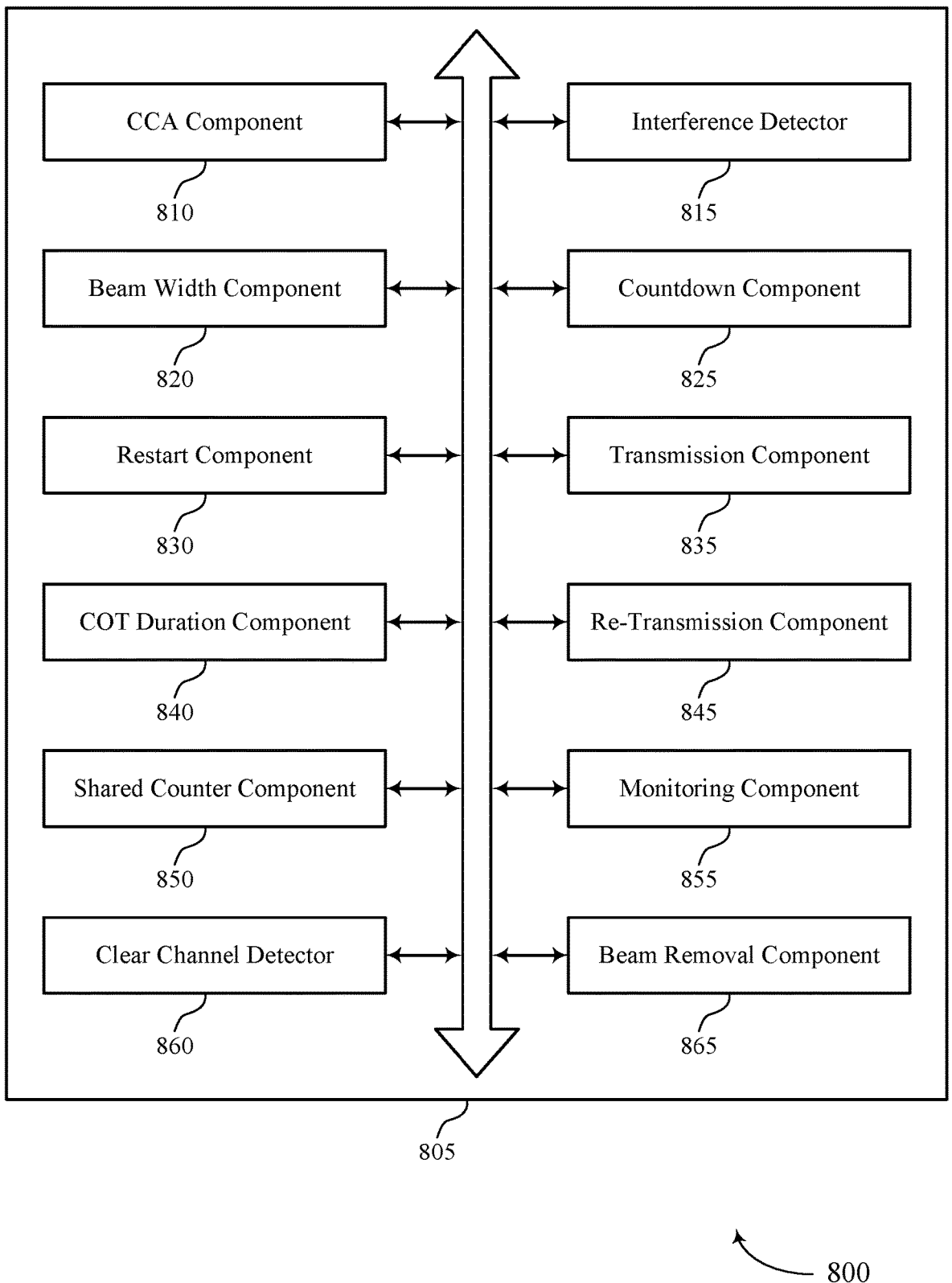
FIG. 8 shows a block diagram of an LBT manager that supports LBT schemes for directional communications in accordance with aspects of the present disclosure.

FIG. 8 shows a block diagram 800 of an LBT manager 805 that supports LBT schemes for directional communications in accordance with aspects of the present disclosure. The LBT manager 805 may be an example of aspects of an LBT manager 615, an LBT manager 715, an LBT manager 910, or an LBT manager 1010 described herein. The LBT manager 805 may include a CCA component 810, an interference detector 815, a beam width component 820, a countdown component 825, a restart component 830, a transmission component 835, a COT duration component 840, a re-transmission component 845, a shared counter component 850, a monitoring component 855, a clear channel detector 860, a beam removal component 865, or any combination of these or other components. Each of these modules may communicate, directly or indirectly, with one another (e.g., via one or more buses).

In a first implementation, the CCA component 810 may perform a first CCA for a channel using a first beam. The interference detector 815 may detect interference for the first beam on the channel based on the first CCA. The CCA component 810 may perform a second CCA for the channel using a second beam based on the detected interference for the first beam, where the second beam is different from the first beam. In some cases, the first beam has a first beam width and the second beam has a second beam width that is narrower than the first beam width. For example, the beam width component 820 may select the first beam for the first CCA and may select the second beam for the second CCA based on the detected interference for the first beam.

In some examples, the interference detector 815 may detect additional interference for the second beam on the channel based on the second CCA. In some examples (e.g., if the second beam corresponds to a first beam direction), the CCA component 810 may perform a third CCA for the channel using a third beam with a third beam width and a second beam direction based on the detected additional interference for the second beam, where the second beam direction is different from the first beam direction. In some cases, the third beam width is equal to the second beam width. In some other examples, the CCA component 810 may perform a third CCA for the channel using a third beam with a third beam width based on the detected additional interference for the second beam, where the third beam width is narrower than the second beam width. In yet some other examples, the restart component 830 may perform a third CCA for the channel using the first beam based on the detected additional interference for the second beam.

In some cases, performing the first CCA may involve the countdown component 825 selecting a countdown value for the first beam from a range of countdown values, where a maximum countdown value of the range of countdown values corresponds to a CW value for the first beam. In some examples, the countdown component 825 may start a counter from the selected countdown value for the first beam and may monitor the channel using the first beam based on starting the counter. The countdown component 825 may decrease the counter by one for each TTI that the channel is determined to be clear according to the monitoring the channel using the first beam, where the interference for the first beam is detected based on the monitoring the channel using the first beam.

In some examples, the counter has a first counter value when the interference for the first beam is detected. Performing the second CCA may involve the countdown component 825 continuing the counter from the first counter value, monitoring the channel using the second beam based on continuing the counter, and decreasing the counter by one for each TTI that the channel is determined to be clear according to the monitoring of the channel using the second beam.

In some examples, performing the second CCA may involve the countdown component 825 restarting the counter from the selected countdown value for the first beam or an updated countdown value for the second beam, monitoring the channel using the second beam based on restarting the counter, and decreasing the counter by one for each TTI that the channel is determined to be clear according to the monitoring of the channel using the second beam.

In some examples, the counter has a first counter value when the interference for the first beam is detected. Performing the second CCA may involve the countdown component 825 modifying the first counter value based on a penalty value, continuing the counter from the modified first counter value, monitoring the channel using the second beam based on continuing the counter, and decreasing the counter by one for each TTI that the channel is determined to be clear according to the monitoring of the channel using the second beam.

In some cases, a CW value for the second beam is equal to the CW value for the first beam. In other cases, the countdown component 825 may determine an updated CW value for the second beam that is different from the CW value for the first beam.

In some cases, a countdown value for the second beam is equal to the selected countdown value for the first beam. In other cases, the countdown component 825 may select an updated countdown value for the second beam that is different from the selected countdown value for the first beam.

In some cases, the countdown value for the first beam is selected from the range of countdown values based on a random number generation process. In some cases, a CCA passes if the counter reaches zero.

In some examples, the second CCA may pass for the channel using the second beam. In these examples, the transmission component 835 may transmit a signal over the channel using the second beam based on the second CCA passing. The COT duration component 840 may determine a channel occupancy time duration based on a beam width of the second beam, where the signal is transmitted according to the channel occupancy time duration. The re-transmission component 845 may receive a negative acknowledgment message in response to the signal and may re-transmit the signal over the channel using a third beam (e.g., with a third beam width) based on the negative acknowledgment message. In some cases, the third beam width may be narrower than the second beam width.

In a second implementation, the shared counter component 850 may start a counter for a set of CCAs for a channel, where each CCA of the set of CCAs is performed using a respective beam of a set of beams. The monitoring component 855 may monitor the channel using the set of beams based on starting the counter. The shared counter component 850 may decrease the counter by a decrement value for each TTI that the channel is determined to be clear for each beam of the set of beams based on the monitoring. The transmission component 835 may transmit one or more signals over the channel using one or more beams of the set of beams based on the counter reaching a threshold value. In some cases, the decrement value may be one and the threshold value may be zero.

In some examples, the monitoring component 855 may monitor the channel using a first beam of the set of beams. The clear channel detector 860 may identify, for the first beam, that the channel is clear for a TTI based on the monitoring the channel using the first beam. In some examples, the monitoring component 855 may monitor the channel using a second beam of the set of beams based on the identifying that the channel is clear for the TTI. In some cases, the counter is started based on identifying, for each beam of the set of beams, that the channel is clear for a TTI.

In some examples, the interference detector 815 may detect interference on the channel for a beam of the set of beams for a threshold number of contiguous TTIs. The beam removal component 865 may remove the beam from the set of beams based on the detected interference. In some examples, the beam removal component 865 may restart the counter based on removing the beam from the set of beams.

In some examples, the interference detector 815 may detect interference on the channel for a beam of the set of beams for a threshold number of contiguous TTIs and may stop the set of CCAs for the channel based on the detected interference.

Figure 9:
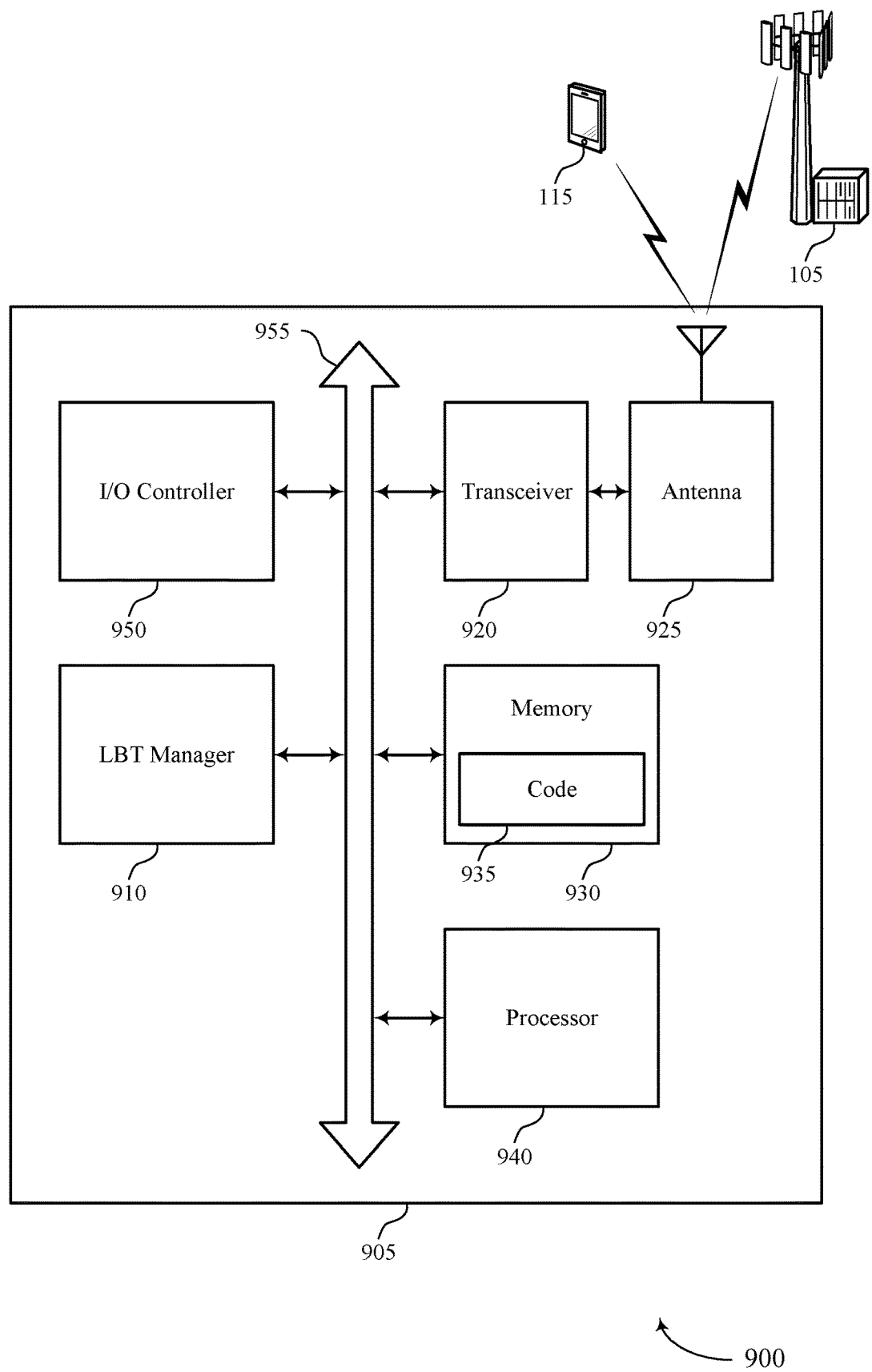
FIG. 9 shows a diagram of a system including a user equipment (UE) that supports LBT schemes for directional communications in accordance with aspects of the present disclosure.

FIG. 9 shows a diagram of a system 900 including a device 905 that supports LBT schemes for directional communications in accordance with aspects of the present disclosure. The device 905 may be an example of or include the components of device 605, device 705, or a UE 115 as described herein. The device 905 may include components for bi-directional voice and data communications including components for transmitting and receiving communications, including an LBT manager 910, a transceiver 920, an antenna 925, memory 930, a processor 940, and an I/O controller 950. These components may be in electronic communication via one or more buses (e.g., bus 955).

In some cases, the LBT manager 910 may perform a first CCA for a channel using a first beam, detect interference for the first beam on the channel based on the first CCA, and perform a second CCA for the channel using a second beam based on the detected interference for the first beam, where the second beam is different from the first beam. Additionally or alternatively, the LBT manager 910 may start a counter for a set of CCAs for a channel, where each CCA of the set of CCAs is performed using a respective beam of a set of beams, monitor the channel using the set of beams based on starting the counter, decrease the counter by a decrement value for each TTI that the channel is determined to be clear for each beam of the set of beams based on the monitoring, and transmit one or more signals over the channel using one or more beams of the set of beams based on the counter reaching a threshold value.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting LBT schemes for directional communications).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
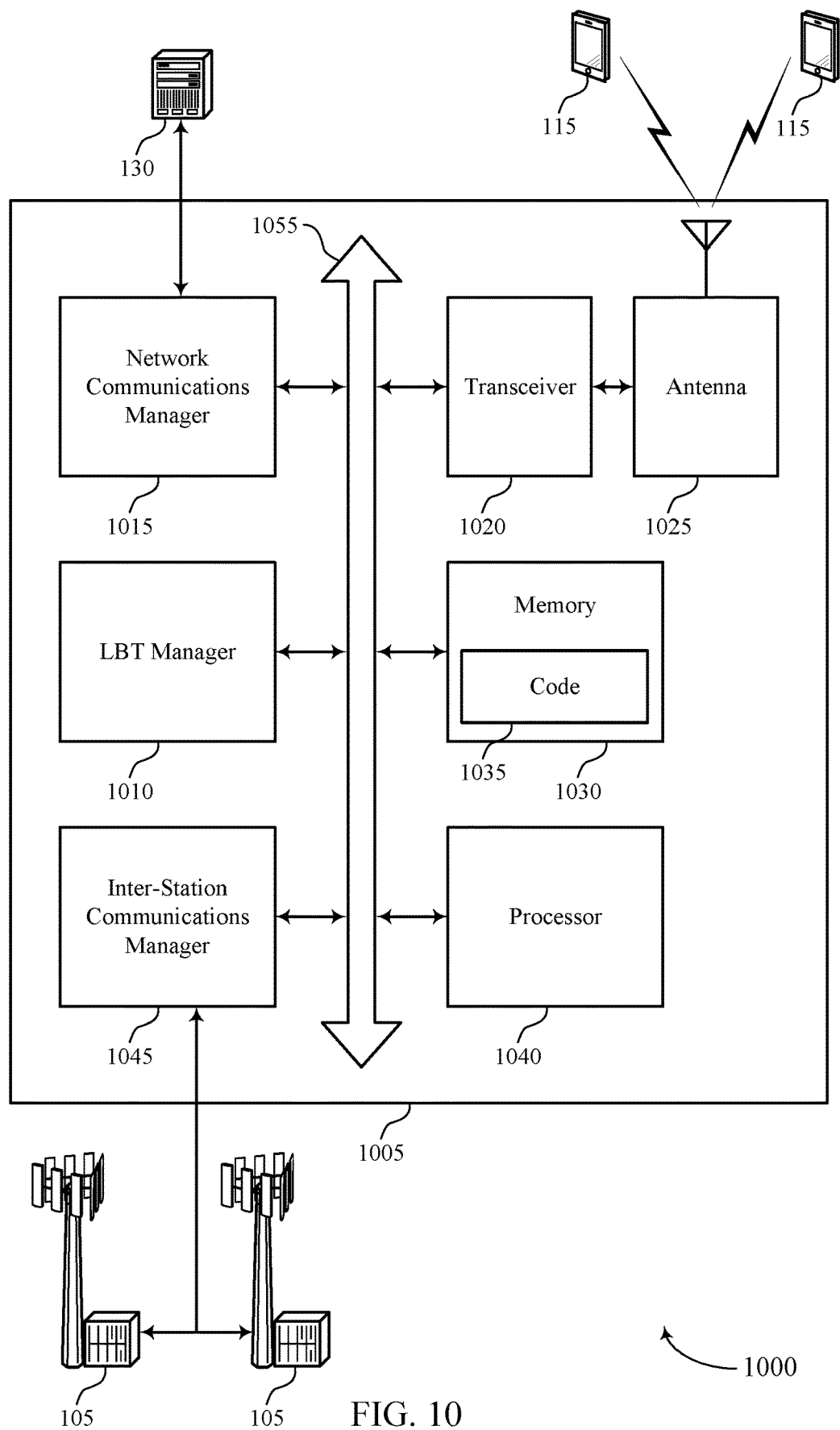
FIG. 10 shows a diagram of a system including a base station that supports LBT schemes for directional communications in accordance with aspects of the present disclosure.

FIG. 10 shows a diagram of a system 1000 including a device 1005 that supports LBT schemes for directional communications in accordance with aspects of the present disclosure. The device 1005 may be an example of or include the components of device 605, device 705, or a base station 105 as described herein. The device 1005 may include components for bi-directional voice and data communications including components for transmitting and receiving communications, including an LBT manager 1010, a network communications manager 1015, a transceiver 1020, an antenna 1025, memory 1030, a processor 1040, and an inter-station communications manager 1045. These components may be in electronic communication via one or more buses (e.g., bus 1055).

In some cases, the LBT manager 1010 may perform a first CCA for a channel using a first beam, detect interference for the first beam on the channel based on the first CCA, and perform a second CCA for the channel using a second beam based on the detected interference for the first beam, where the second beam is different from the first beam. Additionally or alternatively, the LBT manager 1010 may start a counter for a set of CCAs for a channel, where each CCA of the set of CCAs is performed using a respective beam of a set of beams, monitor the channel using the set of beams based on starting the counter, decrease the counter by a decrement value for each TTI that the channel is determined to be clear for each beam of the set of beams based on the monitoring, and transmit one or more signals over the channel using one or more beams of the set of beams based on the counter reaching a threshold value.

Network communications manager 1015 may manage communications with the core network 130 (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting LBT schemes for directional communications).

Inter-station communications manager 1045 may manage communications with other base station 105 and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
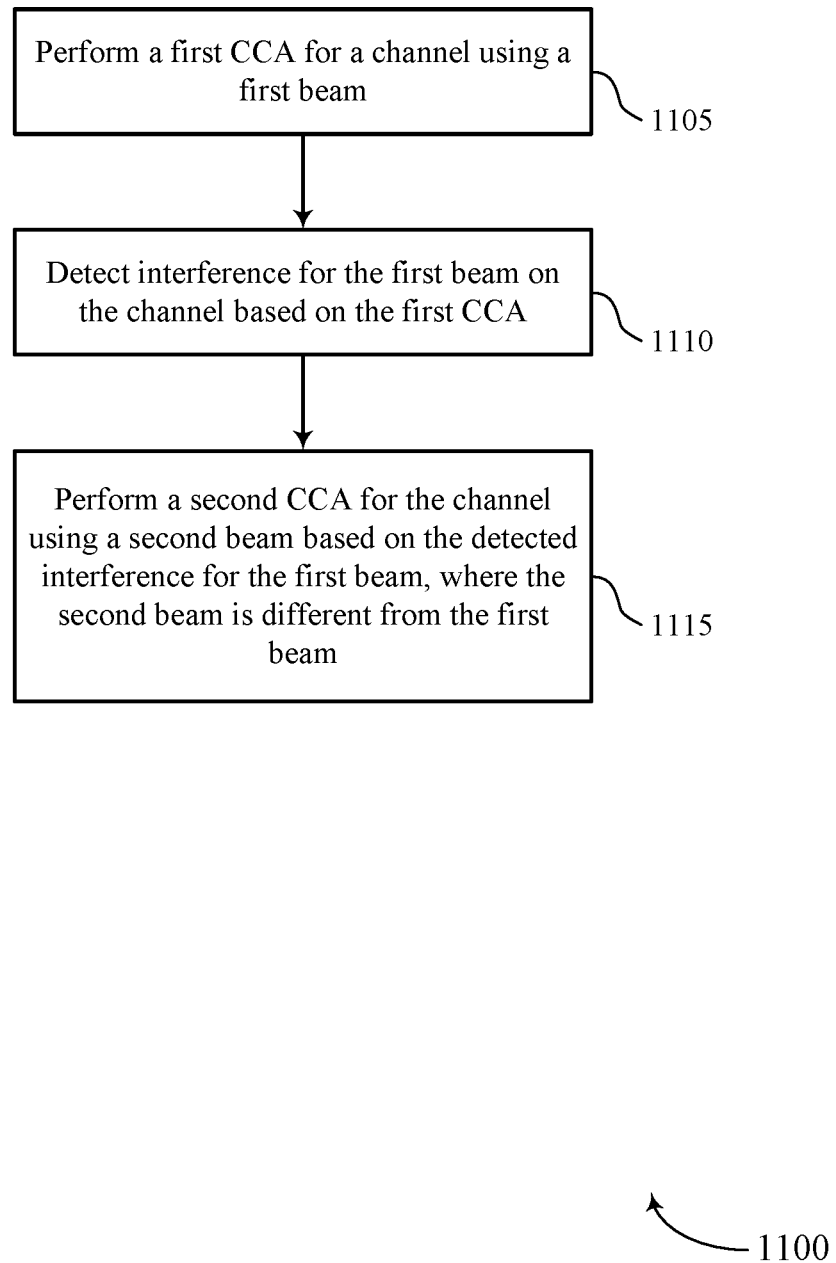
FIGS. 11 through 13 show flowcharts illustrating methods that support LBT schemes for directional communications in accordance with aspects of the present disclosure.

FIG. 11 shows a flowchart illustrating a method 1100 that supports LBT schemes for directional communications in accordance with aspects of the present disclosure. The operations of method 1100 may be implemented by a UE 115, a base station 105, or components of a UE 115 or base station 105 as described herein. For example, the operations of method 1100 may be performed by an LBT manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may perform a first CCA for a channel using a first beam. The operations of 1105 may be performed according to the methods described herein. In some examples, aspects of the operations of 1105 may be performed by a CCA component as described with reference to FIGS. 6 through 10.

At 1110, the UE or base station may detect interference for the first beam on the channel based on the first CCA. The operations of 1110 may be performed according to the methods described herein. In some examples, aspects of the operations of 1110 may be performed by an interference detector as described with reference to FIGS. 6 through 10.

At 1115, the UE or base station may perform a second CCA for the channel using a second beam based on the detected interference for the first beam, where the second beam is different from the first beam. The operations of 1115 may be performed according to the methods described herein. In some examples, aspects of the operations of 1115 may be performed by a CCA component as described with reference to FIGS. 6 through 10.

Figure 12:
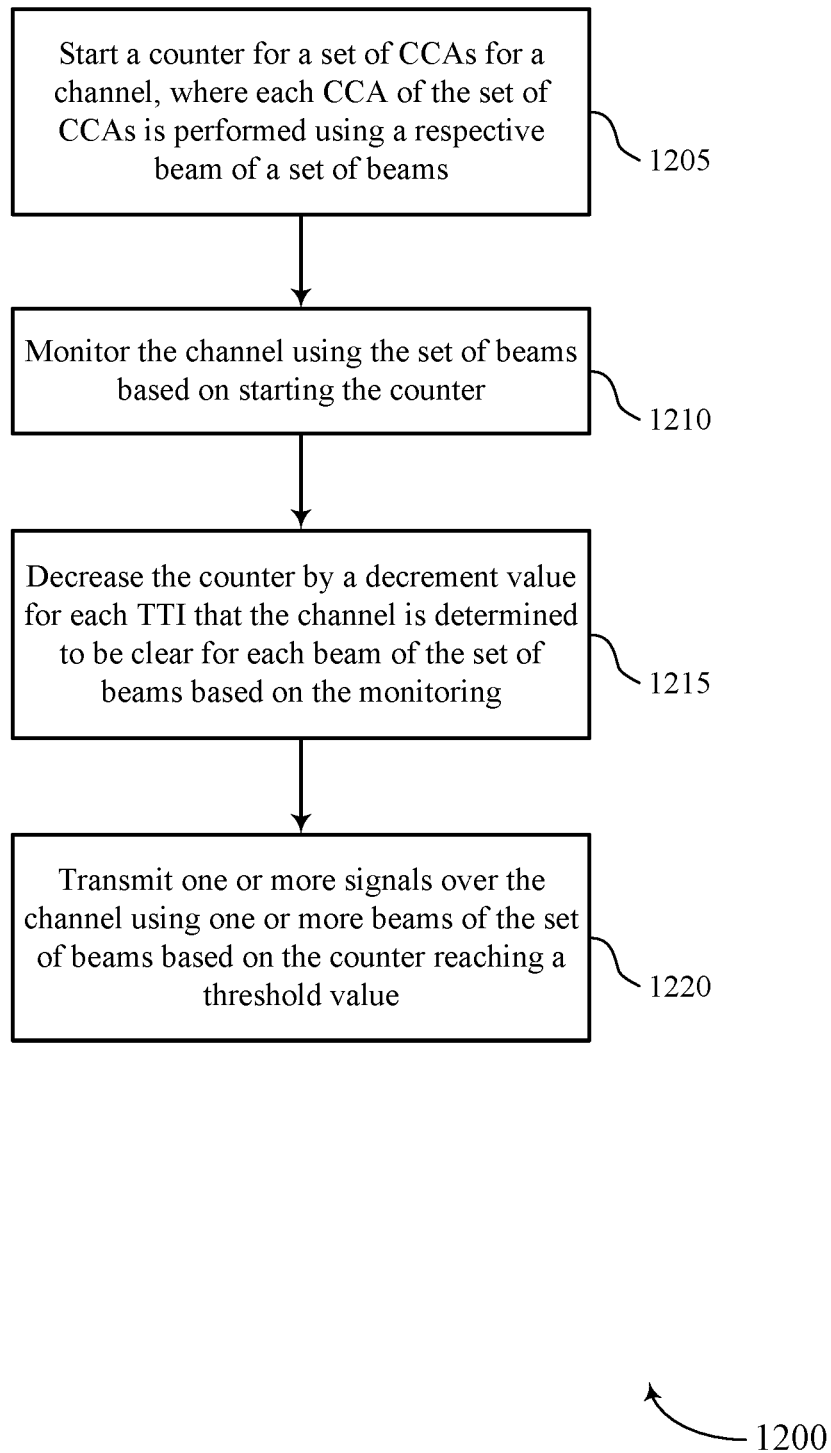

FIG. 12 shows a flowchart illustrating a method 1200 that supports LBT schemes for directional communications in accordance with aspects of the present disclosure. The operations of method 1200 may be implemented by a UE 115, a base station 105, or components of a UE 115 or base station 105 as described herein. For example, the operations of method 1200 may be performed by an LBT manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may start a counter for a set of CCAs for a channel, where each CCA of the set of CCAs is performed using a respective beam of a set of beams. The operations of 1205 may be performed according to the methods described herein. In some examples, aspects of the operations of 1205 may be performed by a shared counter component as described with reference to FIGS. 6 through 10.

At 1210, the UE or base station may monitor the channel using the set of beams based on starting the counter. The operations of 1210 may be performed according to the methods described herein. In some examples, aspects of the operations of 1210 may be performed by a monitoring component as described with reference to FIGS. 6 through 10.

At 1215, the UE or base station may decrease the counter by a decrement value for each TTI that the channel is determined to be clear for each beam of the set of beams based on the monitoring. The operations of 1215 may be performed according to the methods described herein. In some examples, aspects of the operations of 1215 may be performed by a shared counter component as described with reference to FIGS. 6 through 10.

At 1220, the UE or base station may transmit one or more signals over the channel using one or more beams of the set of beams based on the counter reaching a threshold value. The operations of 1220 may be performed according to the methods described herein. In some examples, aspects of the operations of 1220 may be performed by a transmission component as described with reference to FIGS. 6 through 10.

Figure 13:
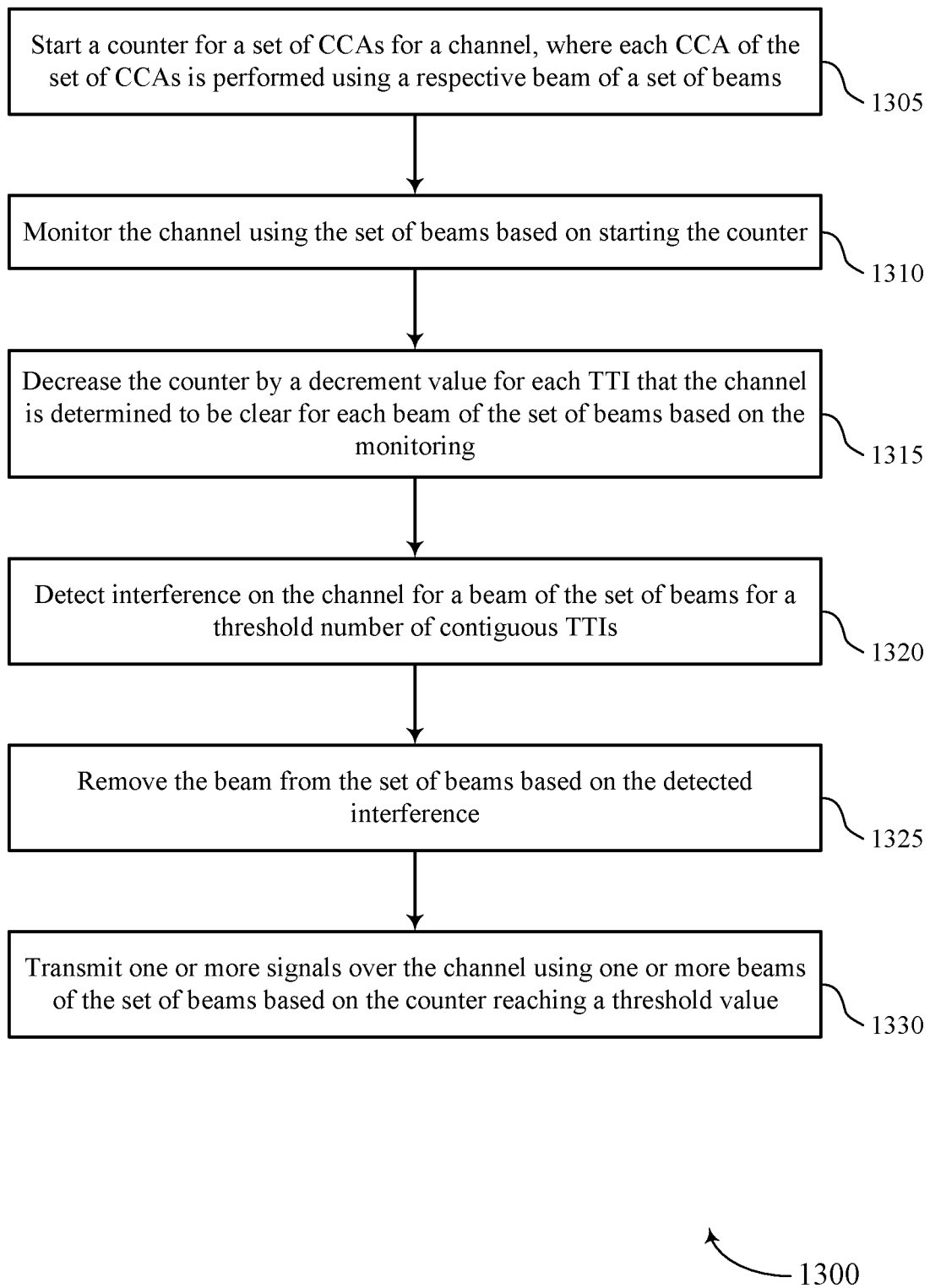

FIG. 13 shows a flowchart illustrating a method 1300 that supports LBT schemes for directional communications in accordance with aspects of the present disclosure. The operations of method 1300 may be implemented by a UE 115, a base station 105, or components of a UE 115 or base station 105 as described herein. For example, the operations of method 1300 may be performed by an LBT manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may start a counter for a set of CCAs for a channel, where each CCA of the set of CCAs is performed using a respective beam of a set of beams. The operations of 1305 may be performed according to the methods described herein. In some examples, aspects of the operations of 1305 may be performed by a shared counter component as described with reference to FIGS. 6 through 10.

At 1310, the UE or base station may monitor the channel using the set of beams based on starting the counter. The operations of 1310 may be performed according to the methods described herein. In some examples, aspects of the operations of 1310 may be performed by a monitoring component as described with reference to FIGS. 6 through 10.

At 1315, the UE or base station may decrease the counter by a decrement value for each TTI that the channel is determined to be clear for each beam of the set of beams based on the monitoring. The operations of 1315 may be performed according to the methods described herein. In some examples, aspects of the operations of 1315 may be performed by a shared counter component as described with reference to FIGS. 6 through 10.

At 1320, the UE or base station may detect interference on the channel for a beam of the set of beams for a threshold number of contiguous TTIs. The operations of 1320 may be performed according to the methods described herein. In some examples, aspects of the operations of 1320 may be performed by an interference detector as described with reference to FIGS. 6 through 10.

At 1325, the UE or base station may remove the beam from the set of beams based on the detected interference. The operations of 1325 may be performed according to the methods described herein. In some examples, aspects of the operations of 1325 may be performed by a beam removal component as described with reference to FIGS. 6 through 10.

At 1330, the UE or base station may transmit one or more signals over the channel using one or more beams of the set of beams based on the counter reaching a threshold value. The operations of 1330 may be performed according to the methods described herein. In some examples, aspects of the operations of 1330 may be performed by a transmission component as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    performing a first directional clear channel assessment for a channel using a first beam having a first beam width;
    detecting interference for the first beam on the channel based at least in part on the first directional clear channel assessment; and
    performing a second directional clear channel assessment for the channel in response to detecting the interference for the first beam, wherein the second directional clear channel assessment is performed using a second beam that is contained within a directional range spanned by the first beam and has a second beam width that is narrower than the first beam width based at least in part on the detected interference for the first beam.

2. The method of claim 1, further comprising:
    detecting additional interference for the second beam on the channel based at least in part on the second directional clear channel assessment; and
    performing a third directional clear channel assessment for the channel using a third beam with a third beam width based at least in part on the detected additional interference for the second beam, wherein the third beam width is narrower than the second beam width.

3. The method of claim 1, wherein performing the first directional clear channel assessment comprises:
    selecting a countdown value for the first beam from a range of countdown values, wherein a maximum countdown value of the range of countdown values corresponds to a contention window value for the first beam;
    starting a counter from the selected countdown value for the first beam;
    monitoring the channel using the first beam based at least in part on starting the counter; and
    decreasing the counter by one for each transmission time interval that the channel is determined to be clear according to the monitoring the channel using the first beam, wherein the interference for the first beam is detected based at least in part on the monitoring the channel using the first beam.

4. The method of claim 3, wherein the counter comprises a first counter value when the interference for the first beam is detected, and wherein performing the second directional clear channel assessment comprises:
    continuing the counter from the first counter value;
    monitoring the channel using the second beam based at least in part on continuing the counter; and
    decreasing the counter by one for each transmission time interval that the channel is determined to be clear according to the monitoring of the channel using the second beam.

5. The method of claim 3, wherein performing the second directional clear channel assessment comprises:
    restarting the counter from the selected countdown value for the first beam or an updated countdown value for the second beam;
    monitoring the channel using the second beam based at least in part on restarting the counter; and
    decreasing the counter by one for each transmission time interval that the channel is determined to be clear according to the monitoring of the channel using the second beam.

6. The method of claim 3, wherein the counter comprises a first counter value when the interference for the first beam is detected, and wherein performing the second directional clear channel assessment comprises:
    modifying the first counter value based at least in part on a penalty value;
    continuing the counter from the modified first counter value;

monitoring the channel using the second beam based at least in part on continuing the counter; and
decreasing the counter by one for each transmission time interval that the channel is determined to be clear according to the monitoring of the channel using the second beam.

7. The method of claim 3, wherein a contention window value for the second beam is equal to the contention window value for the first beam.

8. The method of claim 3, wherein performing the second directional clear channel assessment comprises:
determining an updated contention window value for the second beam that is different from the contention window value for the first beam.

9. The method of claim 3, wherein a countdown value for the second beam is equal to the selected countdown value for the first beam.

10. The method of claim 3, wherein performing the second directional clear channel assessment comprises:
selecting an updated countdown value for the second beam that is different from the selected countdown value for the first beam.

11. The method of claim 3, wherein the countdown value for the first beam is selected from the range of countdown values based at least in part on a random number generation process.

12. The method of claim 3, wherein a directional clear channel assessment passes if the counter reaches zero.

13. The method of claim 1, further comprising:
detecting additional interference for the second beam on the channel based at least in part on the second directional clear channel assessment; and
performing a third directional clear channel assessment for the channel using the first beam based at least in part on the detected additional interference for the second beam.

14. The method of claim 1, wherein the second directional clear channel assessment passes for the channel using the second beam, the method further comprising:
transmitting a signal over the channel using the second beam based at least in part on the second directional clear channel assessment passing.

15. The method of claim 14, further comprising:
determining a channel occupancy time duration based at least in part on the second beam width of the second beam, wherein the signal is transmitted according to the channel occupancy time duration.

16. The method of claim 14, further comprising:
receiving a negative acknowledgment message in response to the signal; and
re-transmitting the signal over the channel using a third beam based at least in part on the negative acknowledgment message, wherein the third beam is different from the second beam.

17. An apparatus for wireless communications, comprising:
a processor;
memory in electronic communication with the processor; and
instructions stored in the memory and executable by the processor to cause the apparatus to:
perform a first directional clear channel assessment for a channel using a first beam having a first beam width;
detect interference for the first beam on the channel based at least in part on the first directional clear channel assessment; and
perform a second directional clear channel assessment for the channel in response to detecting the interference for the first beam, the second directional clear channel assessment performed using a second beam that is contained within a directional range spanned by the first beam and has a second beam width that is narrower than the first beam width based at least in part on the detected interference for the first beam.

18. The apparatus of claim 17, wherein the instructions to perform the first directional clear channel assessment are executable by the processor to cause the apparatus to:
select a countdown value for the first beam from a range of countdown values, wherein a maximum countdown value of the range of countdown values corresponds to a contention window value for the first beam;
start a counter from the selected countdown value for the first beam;
monitor the channel using the first beam based at least in part on starting the counter; and
decrease the counter by one for each transmission time interval that the channel is determined to be clear according to the monitoring the channel using the first beam, wherein the instructions to detect the interference for the first beam are executable by the processor to cause the apparatus to detect the interference for the first beam based at least in part on the monitoring of the channel using the first beam.

19. The apparatus of claim 18, wherein when the counter comprises a first counter value when the interference for the first beam is detected, the instructions to perform the second directional clear channel assessment are executable by the processor to cause the apparatus to:
continue the counter from the first counter value;
monitor the channel using the second beam based at least in part on continuing the counter; and
decrease the counter by one for each transmission time interval that the channel is determined to be clear according to the monitoring of the channel using the second beam.

20. The apparatus of claim 18, wherein the instructions to perform the second directional clear channel assessment are executable by the processor to cause the apparatus to:
restart the counter from the selected countdown value for the first beam or an updated countdown value for the second beam;
monitor the channel using the second beam based at least in part on restarting the counter; and
decrease the counter by one for each transmission time interval that the channel is determined to be clear according to the monitoring of the channel using the second beam.

21. The apparatus of claim 18, wherein when the counter comprises a first counter value when the interference for the first beam is detected, the instructions to perform the second directional clear channel assessment are executable by the processor to cause the apparatus to:
modify the first counter value based at least in part on a penalty value;
continue the counter from the modified first counter value;
monitor the channel using the second beam based at least in part on continuing the counter; and
decrease the counter by one for each transmission time interval that the channel is determined to be clear according to the monitoring of the channel using the second beam.

22. The apparatus of claim 17, wherein when the second directional clear channel assessment passes for the channel using the second beam, the instructions are further executable by the processor to cause the apparatus to:
  transmit a signal over the channel using the second beam based at least in part on the second directional clear channel assessment passing.

23. The apparatus of claim 22, wherein the instructions are further executable by the processor to cause the apparatus to:
  determine a channel occupancy time duration based at least in part on the second beam width of the second beam, wherein the instructions to transmit the signal are executable by the processor to cause the apparatus to transmit the signal according to the channel occupancy time duration.

24. The method of claim 1, further comprising:
  performing, before performing the second directional clear channel assessment for the channel, a third directional clear channel assessment for the channel in response to detecting the interference for the first beam, wherein the third directional clear channel assessment is performed using a third beam that is at least partially outside the directional range spanned by the first beam.

25. The method of claim 1, further comprising:
  performing a third directional clear channel assessment for the channel in response to detecting interference for the second beam on the channel, wherein the third directional clear channel assessment is performed using a third beam that is at least partially outside the directional range spanned by the first beam.

26. The apparatus of claim 17, wherein the instructions are further executable by the processor to cause the apparatus to:
  perform, before performing the second directional clear channel assessment for the channel, a third directional clear channel assessment for the channel in response to detecting the interference for the first beam, the third directional clear channel assessment using a third beam that is at least partially outside the directional range spanned by the first beam.

27. The apparatus of claim 17, wherein the instructions are further executable by the processor to cause the apparatus to:
  perform a third directional clear channel assessment for the channel in response to detecting interference for the second beam on the channel, the third directional clear channel assessment using a third beam that is at least partially outside the directional range spanned by the first beam.

* * * * *